(12) United States Patent
Mori et al.

(10) Patent No.: US 11,880,909 B2
(45) Date of Patent: Jan. 23, 2024

(54) AR DISPLAY APPARATUS AND AR DISPLAY METHOD

(71) Applicant: MAXELL, LTD., Kyoto (JP)

(72) Inventors: Hiromitsu Mori, Tokyo (JP); Seiji Murata, Tokyo (JP); Tomoto Kawamura, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/494,356

(22) PCT Filed: Mar. 17, 2017

(86) PCT No.: PCT/JP2017/011022
§ 371 (c)(1),
(2) Date: Sep. 16, 2019

(87) PCT Pub. No.: WO2018/167966
PCT Pub. Date: Sep. 20, 2018

(65) Prior Publication Data
US 2020/0090375 A1     Mar. 19, 2020

(51) Int. Cl.
*G06T 11/00* (2006.01)
*G06F 16/53* (2019.01)
*G02B 27/01* (2006.01)

(52) U.S. Cl.
CPC .......... *G06T 11/00* (2013.01); *G02B 27/0101* (2013.01); *G06F 16/53* (2019.01); *G02B 2027/014* (2013.01); *G02B 2027/0138* (2013.01)

(58) Field of Classification Search
None
See application file for complete search history.

(56) References Cited

U.S. PATENT DOCUMENTS

2005/0134479 A1    6/2005  Isaji et al.
2010/0253541 A1*  10/2010  Seder ............... G08G 1/165
                                                340/905
(Continued)

FOREIGN PATENT DOCUMENTS

JP    2003-287434 A    10/2003
JP    2004-302903 A    10/2004
(Continued)

OTHER PUBLICATIONS

International Search Report of PCT/JP2017/011022 dated May 16, 2017.
(Continued)

*Primary Examiner* — Sarah Le
(74) *Attorney, Agent, or Firm* — Mattingly & Malur, PC

(57) ABSTRACT

A HUD apparatus that is an AR display apparatus mounted on an on-vehicle system includes: an image selection unit configured to input an image photographed by a camera, select and extract an area of an object from the image; a visibility judgment unit configured to judge visibility of a user with respect to the area of the object on a basis of an index value; an AR image generator unit configured to generate an AR image regarding the object by subjecting the area to image processing for improving the visibility on a basis of the visibility of the area of the object; and an AR display unit configured to superimpose and display the AR image onto a screen. The visibility judgment unit controls whether the AR image is to be displayed or not and content of the image processing to be changed in accordance with the visibility.

18 Claims, 15 Drawing Sheets

(56) References Cited

U.S. PATENT DOCUMENTS

| | | | |
|---|---|---|---|
| 2011/0238290 A1* | 9/2011 | Feng | G08G 1/0969 |
| | | | 701/533 |
| 2012/0044352 A1* | 2/2012 | Aimura | G08G 1/166 |
| | | | 348/148 |
| 2012/0299961 A1* | 11/2012 | Ramkumar | G06T 19/006 |
| | | | 345/632 |
| 2013/0293582 A1 | 11/2013 | Ng-Thow-Hing et al. | |
| 2015/0077323 A1* | 3/2015 | Ramaswamy | G06F 3/0304 |
| | | | 345/156 |
| 2015/0134318 A1* | 5/2015 | Cuthbert | G06F 40/47 |
| | | | 704/2 |
| 2015/0175068 A1* | 6/2015 | Szostak | B60K 35/00 |
| | | | 340/435 |
| 2015/0294570 A1* | 10/2015 | Emura | G06T 11/00 |
| | | | 340/435 |
| 2016/0082840 A1* | 3/2016 | Yoshida | B60Q 9/008 |
| | | | 701/36 |
| 2016/0089980 A1* | 3/2016 | Kurahashi | H04N 5/225 |
| | | | 345/156 |
| 2017/0004373 A1* | 1/2017 | Horiuchi | G06K 9/34 |
| 2017/0053448 A1* | 2/2017 | Kim | G06Q 30/0623 |
| 2017/0270383 A1* | 9/2017 | Onomura | G06F 3/04842 |
| 2017/0301107 A1* | 10/2017 | Sasaki | G06V 20/58 |
| 2018/0136465 A1* | 5/2018 | Chi | G06F 3/0416 |

FOREIGN PATENT DOCUMENTS

| | | | |
|---|---|---|---|
| JP | 2004-355494 | | 12/2004 |
| JP | 2005-38008 | | 2/2005 |
| JP | 2005-182306 | A | 7/2005 |
| JP | 2010-066042 | A | 3/2010 |
| JP | 2012-006469 | * | 1/2012 |
| JP | 2012-006469 | A | 1/2012 |
| JP | 2012-162109 | A | 8/2012 |
| JP | WO2013161028 A1 | * | 10/2013 |
| JP | 2015-523624 | A | 8/2015 |
| JP | 2015-221633 | | 12/2015 |
| JP | 2016-095688 | A | 5/2016 |

OTHER PUBLICATIONS

Japanese Office Action received in corresponding Japanese Application No. 2020-073217 dated Mar. 30, 2021.
Japanese Office Action received in corresponding Japanese Application No. 2021-150800 dated Aug. 30, 2022.

* cited by examiner

FIG. 7

AR DISPLAY CONTROL BASED ON VISIBILITY (1)

| CLASSIFICATION | (A) FIRST CLASSIFICATION | (B) SECOND CLASSIFICATION |
|---|---|---|
| IMAGE (VICINITY OF SIGNBOARD) | ABC (signboard) | ABC (signboard, 41) |
| VISIBILITY OF DRIVER (CHARACTERS OF SIGNBOARD) | EASILY RECOGNIZE VISUALLY | HARDLY RECOGNIZE VISUALLY |
| OBJECT DISTANCE | NEAR | FAR |
| OBJECT SIZE | LARGE | SMALL |
| VI: VISIBILITY INDEX VALUE | HIGH (WITHIN FIRST RANGE) $VI \geq H1$ | LOW (WITHIN SECOND RANGE) $H1 > VI$ |
| AR DISPLAY TYPE | (FIRST TYPE) AR image is not displayed. (Alternatively, AR image is displayed. Processing is not executed.) | (SECOND TYPE) AR image is displayed. Processing is executed. |
| AR IMAGE | (NOT DISPLAY) | ABC (EX.: ENLARGED IMAGE) |

FIG. 8
AR DISPLAY CONTROL BASED ON VISIBILITY (2)

| CLASSIFICATION | (A) FIRST CLASSIFICATION | (B) SECOND CLASSIFICATION | (C) THIRD CLASSIFICATION |
|---|---|---|---|
| IMAGE (VICINITY OF SIGNBOARD) | ABC | ABC | ABC (41) |
| VISIBILITY OF DRIVER (CHARACTERS OF SIGNBOARD) | EASILY RECOGNIZE VISUALLY (CAN CLEARLY RECOGNIZE VISUALLY) | HARDLY RECOGNIZE VISUALLY (1) (CAN RECOGNIZE VISUALLY IF CAREFUL) | HARDLY RECOGNIZE VISUALLY (2) (CANNOT RECOGNIZE VISUALLY) |
| OBJECT DISTANCE | NEAR | MEDIUM | FAR |
| OBJECT SIZE | LARGE | MEDIUM | SMALL |
| VI: VISIBILITY INDEX VALUE | HIGH (WITHIN FIRST RANGE) $VI \geq H1$ | MEDIUM (WITHIN SECOND RANGE) $H1 > VI \geq H2$ | LOW (WITHIN THIRD RANGE) $H2 > VI$ |
| AR DISPLAY TYPE | (FIRST TYPE) AR image is not displayed. (Alternatively, AR image is displayed. Processing is not executed.) | (SECOND TYPE) AR image is displayed. First processing is executed. | (THIRD TYPE) AR image is displayed. Second processing is executed. |
| AR IMAGE | (NOT DISPLAY) | ABC (EX.: ENLARGED IMAGE) | ABC (OCR CHARACTER IMAGE) (OR RETRIEVE) |

FIG. 9

AR FUNCTION USER SETTING

● SETTING OF AR FUNCTION TYPE
- [ ] DRIVE ASSIST (TRAFFIC SAFETY)
- [ ] NAVIGATION (DESTINATION, TRAVELING DIRECTION)
- [ ] TRAFFIC SIGN
- [x] SIGNBOARD
- [ ] BUILDING
- [ ] ......

● SETTING OF AR INFORMATION CATEGORY

- [ ] CATEGORY A   PERSON
  - · NAME
  - · ADDRESS
  - · TELEPHONE NUMBER
  - ........

- [x] CATEGORY B   SPOT
  - · CONVENIENCE STORE
  - · GAS STATION
  - · PARKING LOT
  - · HOSPITAL
  - · LAVATORY
  - · RESTAURANT
  - ........

- [ ] CATEGORY C   SITUATION
  - · WEATHER
  - · SURFACE CONDITION
  - · TRAFFIC CONGESTION
  - · EMPTY SPACE IN PARKING LOT
  - · TRAFFIC ACCIDENT
  - · CONSTRUCTION
  - ........

- [ ] CATEGORY D   TIME
  - · WAITING TIME
  - · OPENING/ CLOSING TIME
  - · REQUIRED TIME
  - · PASSAGE TIME
  - ........

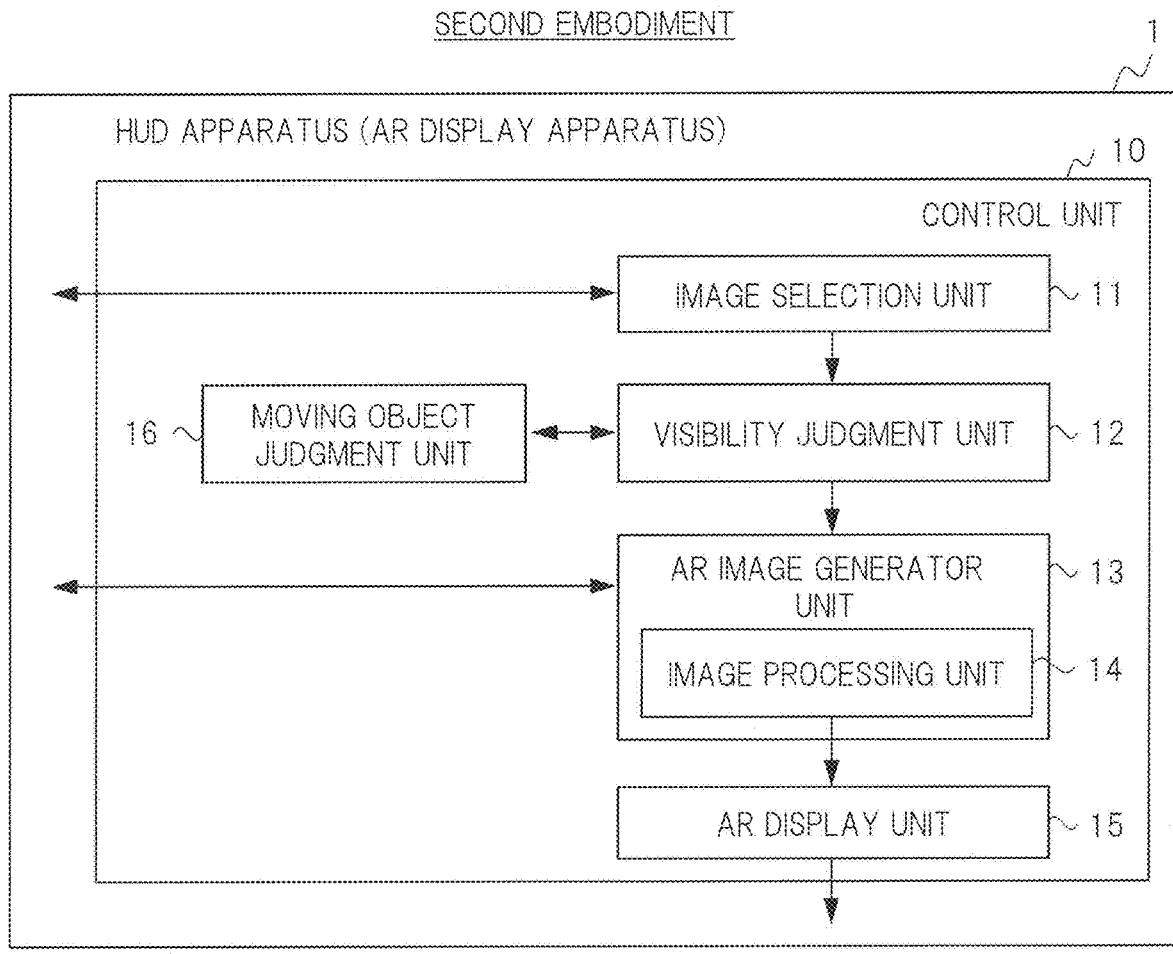

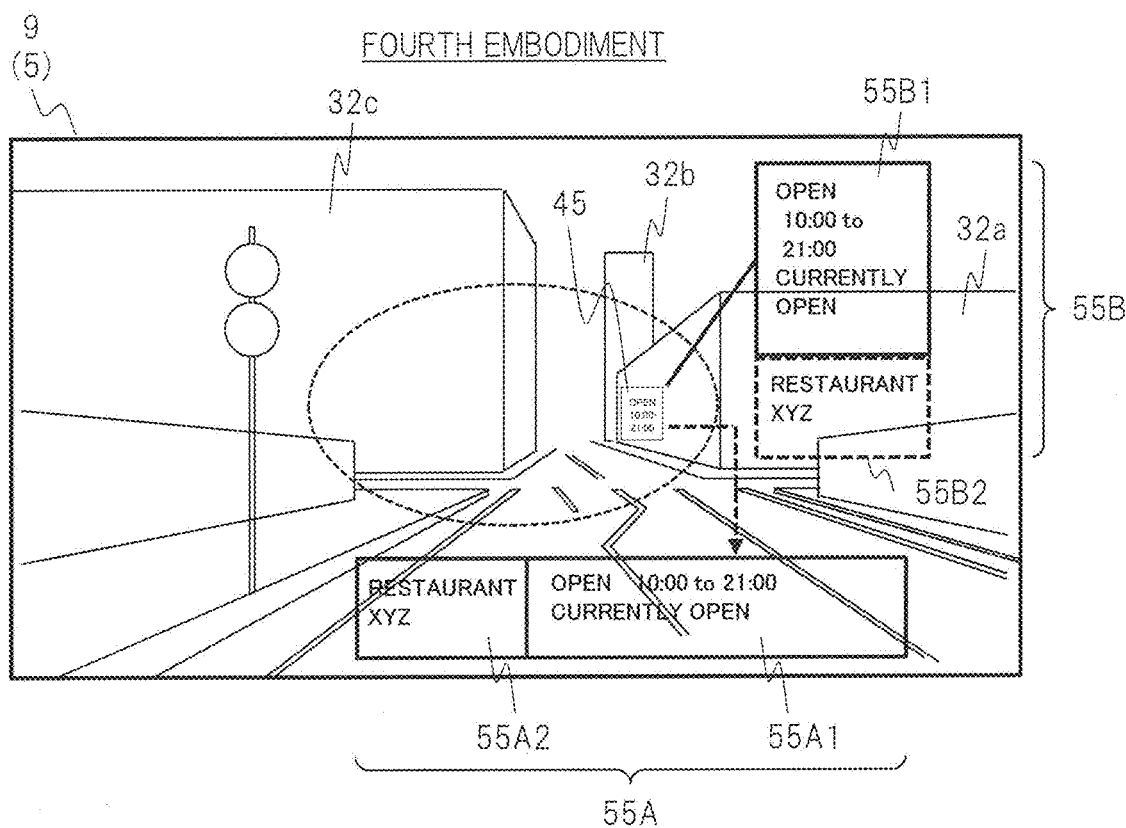

AR DISPLAY APPARATUS AND AR DISPLAY METHOD

TECHNICAL FIELD

The present invention relates to a technique for a display apparatus, and particularly, the present invention relates to a display technique to provide image information of Augmented Reality (AR) to a user.

BACKGROUND ART

As an AR display apparatus with a function to provide AR image information and its system, for example, one that presents AR image information to a driver in an on-vehicle system for a vehicle for the purpose of drive assist, navigation, provision of related information, or the like is cited. For example, there is an on-vehicle Head Up Display (HUD) apparatus that have an AR display function (AR-HUD). In the AR-HUD, an AR image is projected and displayed, as a virtual image, so as to superimpose the AR image onto an actual view in a field of view of a driver. The actual view is external world video that is transmitted on a screen in a front shield or the like of a driver's seat. As the AR image information, various kinds including vehicle information on a vehicle speed and the like, an image of a vehicle traveling direction arrow for drive assist or navigation, caution information for pedestrians or the like, information on signs or signboards are cited. As original data of the AR image information, for example, information from on-vehicle sensors, the map information for a car navigation system, and the like are utilized.

As an example of conventional technology regarding the AR display apparatus, Japanese Patent Application Publication No. 2016-95688 (Patent document 1) is cited. Patent document 1 describes that in a case where an on-vehicle information display apparatus photographs a signboard and the like outside a vehicle by an on-vehicle camera, an image such as a signboard in a photographed image is recognized accurately, a recognition result is converted into an image that a user can understand, and the converted image is displayed. Patent document 1 also describes that a character string contained in the signboard is translated and displayed.

RELATED ART DOCUMENTS

Patent Documents

Patent document 1: Japanese Patent Application Publication No. 2016-95688

SUMMARY OF THE INVENTION

Problems to be Solved by the Invention

In the AR display apparatus such as a conventional on-vehicle HUD apparatus, with respect to presentation of video including an AR image on a screen, there is a problem regarding visibility of the video including an object and the AR image by a user (a driver or the like) as follows. In other words, there is a problem regarding recognition by the user, easiness of information processing, comfort of AR usage, and the like.

For example, the conventional on-vehicle HUD apparatus generates an AR image regarding an object of an external world as it is on the basis of an image photographed by a camera, which includes the object, and superimposes and displays the AR image on a screen. At that time, for example, there is the object such as a signboard, in which a driver is interested, in the screen and a field of view of the driver. However, the driver may hardly recognize the object visually, or may not be able to recognize the object visually. Alternatively, even though the AR image regarding the object is presented, the driver may hardly recognize the AR image visually, or may not be able to the AR image visually. For example, the driver may not be able to decipher (or make out) characters described on the object, such as a signboard, depending upon a driving situation or the like. Further, for example, in a case where there is a signboard comparatively far from an own vehicle, the driver may not be able to visually recognize information described on the signboard so long as the own vehicle approaches the signboard to an extent. In such a case, the driver cannot recognize the object, or cannot obtain information regarding the object, whereby it is inconvenient for the driver.

It is an object of the present invention to provide a technique capable of realizing suitable AR presentation with respect to an AR display apparatus by improving visibility of video, which contains an object and an AR image, by a user (a driver or the like).

Means for Solving the Problem

A representative embodiment of the present invention is an AR display apparatus that has a configuration as described below.

An AR display apparatus according to one embodiment is an AR display apparatus with an AR function to superimpose and display image information of augmented reality onto a screen, the screen transmitting an actual view of an external world. The AR display apparatus includes: an image selection unit configured to input an image photographed by a camera, select and extract an area of a predetermined object from the image; a visibility judgment unit configured to judge visibility of a user with respect to the extracted area of the object on a basis of an index value; an AR image generator unit configured to generate an AR image by subjecting the area of the object to image processing for improving the visibility on a basis of the visibility of the area of the object, the AR image being image information on the augmented reality regarding the object; and an AR display unit configured to superimpose and display the AR image onto the screen that transmits the actual view of the external world. In this case, the visibility judgment unit controls whether the AR image is to be displayed or not and content of the image processing to be changed in accordance with the visibility.

Effects of the Invention

According to the representative embodiment of the present invention, it is possible to realize a suitable AR presentation with respect to an AR display apparatus by improving visibility of video, which contains an object and an AR image, by a user.

BRIEF DESCRIPTIONS OF THE DRAWINGS

FIG. 7 is a view illustrating a first example of an AR display control based on visibility according to the first embodiment;

FIG. 8 is a view illustrating a second example of the AR display control based on the visibility according to the first embodiment;

FIG. 9 is a view illustrating user setting of an AR function according to the first embodiment;

FIG. 10 is a view illustrating a HUD apparatus that is an AR display apparatus according to a second embodiment of the present invention;

FIG. 15 is a view illustrating an example of a screen according to the fourth embodiment.

DETAILED DESCRIPTION OF EMBODIMENTS

Figure 1:
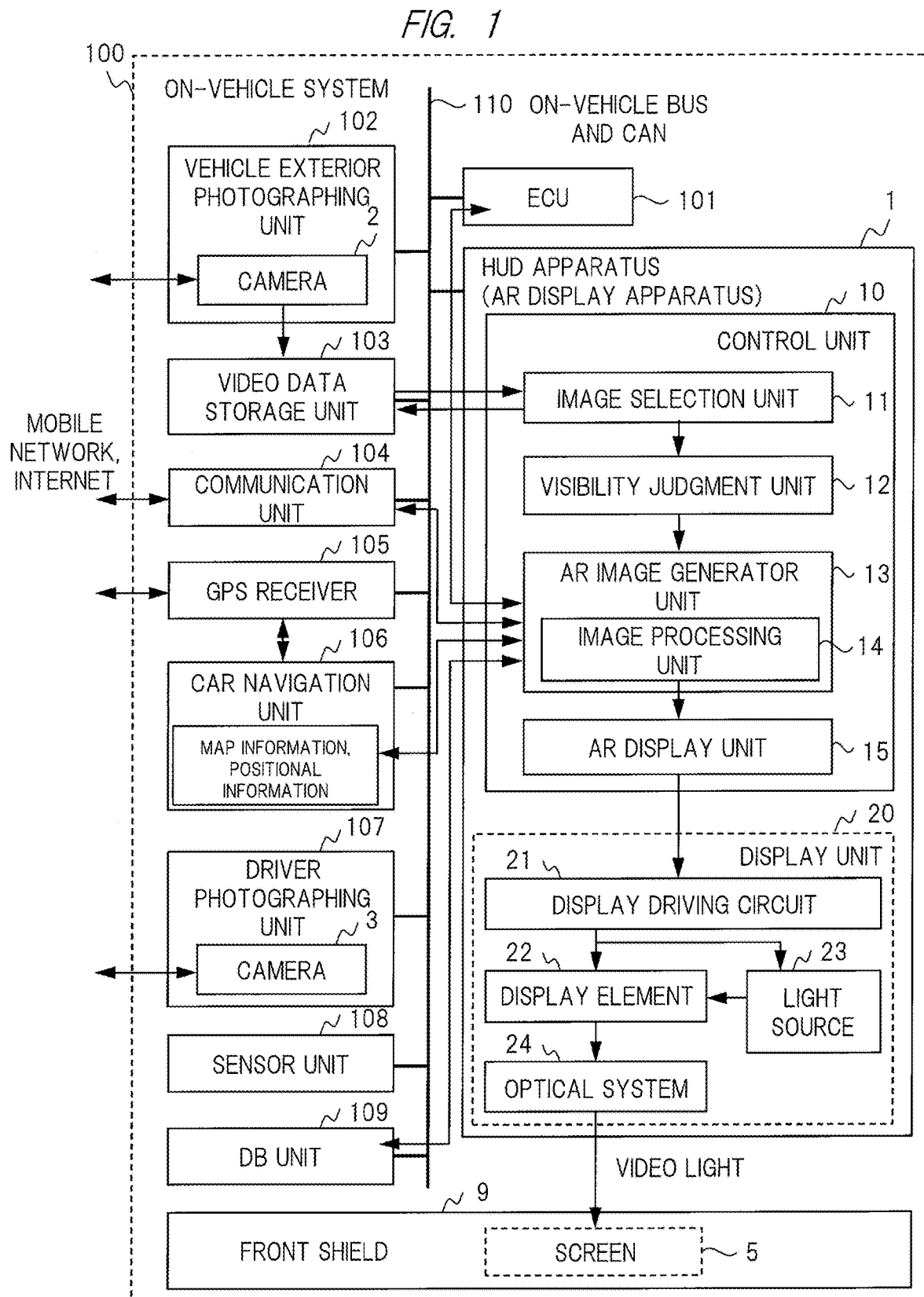
FIG. 1 is a view illustrating a configuration of an on-vehicle system including a HUD apparatus that is an AR display apparatus according to a first embodiment of the present invention.

Hereinafter, embodiments of the present invention will be described in detail with reference to the drawings. Note that in all of the drawings for explaining the embodiments, the same reference numeral is generally assigned to the same unit, and its repeated explanation will be omitted.

First Embodiment

An AR display apparatus and the like according to a first embodiment of the present invention will be described with reference to FIG. 1 to FIG. 9. A case where the AR display apparatus according to the first embodiment is implemented as a HUD apparatus of an on-vehicle system is illustrated. An AR display method according to the first embodiment is a method that includes steps executed by the AR display apparatus according to the first embodiment. The AR display apparatus according to the first embodiment has a function to extract an object such as a signboard from a photographed image of a vehicle exterior camera, generate and present an AR image that is easily recognized visually by image processing with respect to an object that a driver hardly recognizes visually. Further, the AR display apparatus according to the first embodiment has a function to change away of presenting the AR image in accordance with a position, a size, a distance, an attitude, image quality, and the like of the object in the photographed image, and heighten visibility of the driver.

AR Display Apparatus and On-Vehicle System (1)

FIG. 1 illustrates a configuration of an on-vehicle system 100 that includes a HUD apparatus 1. The HUD apparatus 1 is the AR display apparatus according to the first embodiment. The on-vehicle system 100 is a system to be mounted on a vehicle. The driver who is a user operates and uses the on-vehicle system 100 and the HUD apparatus 1. This HUD apparatus 1 is particularly an AR-HUD apparatus that has an AR function.

The on-vehicle system 100 includes an ECU (Engine Control Unit) 101, the HUD apparatus 1, a vehicle exterior photographing unit 102 including a camera 2, a video data storage unit 103, a communication unit 104, a GPS receiver 105, a car navigation unit 106, a driver photographing unit 107 including a camera 3, a sensor unit 108, a DB unit 109, and the like. Each of them is connected to an on-vehicle bus and a CAN (Car Area Network) 110. The on-vehicle system 100 includes, as the others, an operation unit, a power supply unit, and the like (which are not illustrated in the drawings).

The HUD apparatus 1 includes a control unit 10 and a display unit 20, and further includes a storage unit, an operation unit, an audio output unit, and a power supply unit (not illustrated in the drawings). The control unit 10 is configured by a microcomputer or the like, and controls the whole HUD apparatus 1. The display unit 20 is configured by a projection display apparatus, and projects video light for forming an AR virtual image onto a front shield 9. This causes a screen 5 to be formed on the front shield 9, whereby the AR virtual image is superimposed and displayed on a transparent actual view by the screen 5. An operational input by the user, for example, ON/OFF of the AR function is possible by using the operation unit (including an operation panel, for example). Audio associated with car navigation or AR display can be outputted by using the audio output unit.

The display unit 20 includes a display driving circuit 21, a display element 22, a light source 23, an optical system 24, and the like, and they are connected to the display unit 20. The display driving circuit 21 generates a display signal for an AR display control on the basis of video data that are AR data from an AR display unit 15 of the control unit 10, and drive the display element 22 and the light source 23. The light source 23 emits light to the display element 22 on the basis of the display signal. The light source 23 is configured by an LED element or a laser element, for example. The display element 22 can be configured by a known SLM (Spatial Light Modulator), a MEMS mirror, a DMD (Digital Micromirror Device, register trademark), an LCD, or the like, for example. The display element 22 generates video light on the basis of the display signal and the light from the light source 23, and emits the video light to the optical system 24.

The optical system 24 guides the video light from the display element 22 to the screen 5 on the front shield 9. The optical system 24 includes elements such as a lens or a mirror, and a driving unit, such as a motor, for driving them. The optical system 24 also has a function to drive the mirror on the basis of a control of the display unit 20 or a user operation to change an angle of tilt of the mirror, for example. This makes it possible to basically adjust a position and the like of the screen 5 (a basic display area of a virtual image) on the front shield 9 so as to move from right to left or up and down when viewed from the driver.

The ECU 101 executes a vehicle control including an engine operation control. The ECU 101 may have an advanced function for drive assist or a drive automatic control (for example, an inter-vehicle distance control function). In such a case, the ECU 101 outputs information for the drive assist to the HUD apparatus 1 to control the HUD apparatus 1. Thus, the ECU 101 may cause the HUD apparatus 1 to execute AR display for the drive assist (for example, output of inter-vehicle distance information).

The vehicle exterior photographing unit 102 includes the camera 2. The vehicle exterior photographing unit 102 uses one or more camera 2 to photograph an actual view of an external world of an own vehicle under suspension of the vehicle or while the vehicle is traveling, and acquire video data (containing image frames in time series) and vehicle surrounding information. The vehicle exterior photographing unit 102 stores them in the video data storage unit 103, or outputs them to the ECU 101. The camera 2 is a vehicle exterior camera 2, for example, and is installed at a predetermined position, for example, in a front bumper of the vehicle, in the vicinity of each of four sides of the front shield 9, or in the vicinity of each of rearview mirrors at both sides of the vehicle. The camera 2 photographs a predetermined area in a predetermined direction. The camera 2 photographs an area including the actual view in front of the vehicle, which corresponds to a field of view of the driver.

The vehicle exterior photographing unit 102 may include a signal processing unit that can process and calculate an image of the one or more camera 2 to acquire the vehicle surrounding information. The vehicle exterior photographing unit 102 may not include the signal processing unit. The signal processing unit may be provided in the ECU 101 or the HUD apparatus 1. The vehicle surrounding information is information containing a state such as approach of an object in a range including ahead of the vehicle and in the vicinity of side surfaces of the vehicle.

The video data storage unit 103 stores video data and the like from the camera 2 therein. The video data storage unit 103 may be provided in the HUD apparatus 1. Note that the video data is not stored and left in the video data storage unit 103 or the like in the vehicle from the viewpoint of information security and the like, but may be stored in an external data center or the like through the communication unit 104 to manage the data outside the on-vehicle system 100.

The communication unit 104 is a portion that includes a communication interface apparatus. The communication interface apparatus executes communication with an external mobile network or the Internet. The communication unit 104 executes communication with a server of a data center on the Internet on the basis of a control from the HUD apparatus 1 or the like, for example. Herewith, the HUD apparatus 1 can refer to and acquire original data for the AR display and related information from the server.

The GPS receiver 105 acquires positional information of the own vehicle (which is indicated by latitude and longitude, for example) on the basis of communication with external GPS satellites. Although it is not illustrated in FIG. 1, the GPS receiver 105 further includes a known VICS receiver and the like.

The car navigation unit 106 is a part of an existing car navigation system mounted on the vehicle, and holds map information and the positional information acquired by using the GPS receiver 105. The car navigation unit 106 grasps the positional information of the own vehicle through the GPS receiver 105. The ECU 101 and the HUD apparatus 1 acquires the positional information of the own vehicle from the GPS receiver 105 and the car navigation unit 106. The HUD apparatus 1 can also refer to the map information and destination information from the car navigation unit 106, and use them as the original data for the AR display. For example, the HUD apparatus 1 may generate an arrow image and the like as an example of the AR image on the basis of the original data. The arrow image indicates a traveling direction on a road for navigation toward a destination.

The driver photographing unit 107 includes the camera 3. The driver photographing unit 107 uses one or more camera 3 to photograph an area including eyes and a face of the driver, and executes a predetermined process. The camera 3 is a driver camera, or an in-vehicle camera. The driver photographing unit 107 may store video data photographed by the camera 3 in the video data storage unit 103. The driver photographing unit 107 includes a signal processing unit that executes a predetermined process from an image of the camera 3. The signal processing unit may be provided in the ECU 101 or the HUD apparatus 1. The driver photographing unit 107 can be configured by using a known technique. Note that in the first embodiment, there is no need to use the driver photographing unit 107. The driver photographing unit 107 is used in a third embodiment and the like.

The driver photographing unit 107 has the following as a predetermined processing function, for example. The driver photographing unit 107 can detect drowsy driving by judging a state such as blink of the eyes of the driver, for example. The driver photographing unit 107 can detect positions of the eyes of the driver inside a space (in the vehicle), for example, and can also judge an attitude and the like of the driver from the positions of the eyes. The driver photographing unit 107 has a function (that is, a sight line tracking function) to detect a line of sight of the driver by judging a pupil of the eye of the driver or a light reflective point, for example. The ECU 101 and the HUD apparatus 1 can control the on-vehicle system 100 by acquiring driver information, such as the line of sight, from the driver photographing unit 107.

The sensor unit 108 includes a group of known sensors mounted on the vehicle, and outputs vehicle information such as the detected a vehicle speed. The ECU 101 and the HUD apparatus 1 acquire the vehicle information to control the on-vehicle system 100. The sensor unit 108 includes, as a group of sensors, a speed meter, an acceleration sensor, a gyroscope sensor, a geomagnetic sensor, and an infrared sensor. The sensor unit 108 may include a distance sensor to measure a distance between the own vehicle and the object. The acceleration sensor and the gyroscope sensor detect acceleration, angular velocity, and the like as state information of the own vehicle.

The DB unit 109 is configured by a storage or the like, and data and information for using the AR display are stored in a DB. Data and information of this DB contain the original data for generating the AR image, setting information for an AR process, and user setting information. The original data are data used for drive assist or navigation, for example. The setting information is feature information or definition information of the object, or reference images of image matching, for example. The user setting information is setting information on ON/OFF of a function provided by the AR display apparatus or setting information on a category of AR display target information, for example.

Note that the DB unit 109 and its DB are provided in the on-vehicle system 100, but outside the HUD apparatus 1. However, it is not limited to this. The DB unit 109 and its DB may be provided in the HUD apparatus 1, or may be provided in a data center on an external communication network of the on-vehicle system 100. This DB may be integrated into a DB in the car navigation unit 106. Information acquired from an external server or a DB via the communication unit 104 may be stored in this DB. In a case where the DB is provided on the external communication network, communication is required. However, there is no need to provide a DB in the on-vehicle system 100, whereby it is possible to save a memory capacity. In a case where the DB is provided in the on-vehicle system 100 or in the HUD apparatus 1, securement of the memory capacity is required. However, high speed retrieval is possible because communication is not required.

The front shield 9 is configured by glass with transparency and rigidity. When the AR function is not used, the whole area of the screen 5 on the front shield 9 becomes a transparent state, and the actual view of the external world is transmissive. When the AR function is used, the AR image is superimposed and displayed on the transparent actual view by the screen 5. The front shield 9 may be configured by a film with a reflection function and a transmission function. The front shield 9 may be configured by an organic EL apparatus or the like. The organic EL apparatus has characteristics to become transparent in a non-energization state or emit light in an energization state. The front shield 9 may be configured by an organic EL display apparatus with flexibility. An AR dedicated display board (combiner or the like) may be separately provided in front of the front shield 9.

AR Display Apparatus and On-Vehicle System (2)

Figure 2:
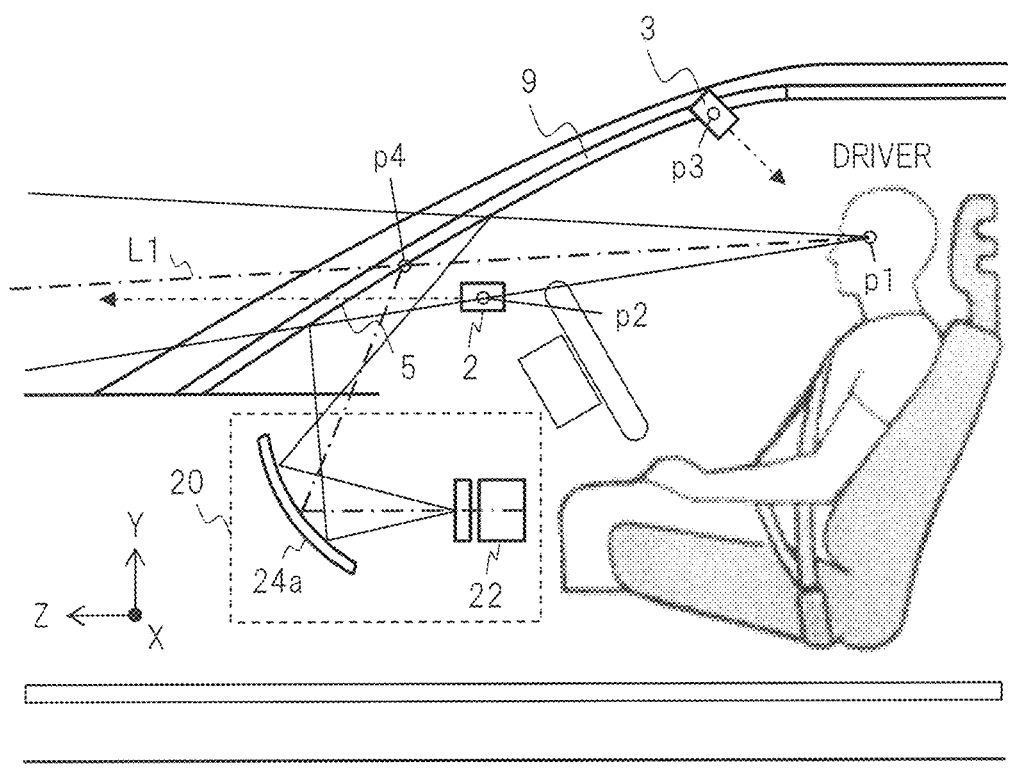
FIG. 2 is a view schematically illustrating an arrangement configuration example of respective units according to the first embodiment when the vicinity of a driver seat of a vehicle is viewed from the side.

FIG. 2 schematically illustrates an arrangement configuration example of the respective units when the vicinity of a driver seat in front of the vehicle is viewed from the side. FIG. 2 illustrates a state where the driver sits on the driver seat. The curved front shield 9 is provided in front of the driver (Z direction). For example, the display unit 20 of the AR display apparatus, the car navigation unit 106 and the like (not illustrated in FIG. 2) are installed at a position of a central console of a front dashboard. FIG. 2 illustrates the display element 22 and a mirror 24a in the optical system 24. Light emitted forward from the display element 22 is reflected toward the front shield 9 by the mirror 24a that is a concave mirror. The reflected light is reflected toward the eyes (a point p1) of the driver by an inner surface of the front shield 9. Herewith, the screen 5 is formed at a part of the inner surface of the front shield 9. The eyes of the driver or a position of a point of view is indicated by the point p1. A line of sight L1 of the driver is indicated by a dash-dot-dash line. A point of regard, which is an intersection between the front of the line of sight L1 and the screen 5, is indicated by a point p4.

The camera 2 is installed at predetermined position in front of the vehicle, for example, in the vicinity of the rearview mirror. The position of the camera 2 is indicated by a point p2. The camera 2 photographs a direction in front of the vehicle. The camera 3 is installed at a predetermined position in front of the vehicle, for example, obliquely upward of the driver seat. The position of the camera 3 is indicated by a point p3. The camera 3 photographs a direction of the driver seat and the face of the driver.

The display unit 20 of the AR display apparatus, the positions of the camera 2 and the camera 3 (three-dimensional spatial coordinate), and the direction are set in advance, and they have a predetermined relationship. Further, they can be set so as to be changed by an adjusting operation of the user. The driver adjusts the driver seat, and adjusts the position of the screen 5 by the display unit 20.

There is an object in an actual view (for example, a road surface mark or a signboard) in front of the line of sight L1 of driver. The object or an object as an AR virtual image associated with the object is viewed at the point p4 of the screen 5. The on-vehicle system 100 and the HUD apparatus 1 have a function to measure and calculate a distance (an object distance) between the object in the actual view and the camera 2 of the vehicle (the point p2). Further, the object distance can be converted as a distance between the point of view and the object on the basis of a positional relationship between the point p2 of the camera 2 and the point p1 of the point of view. Namely, the on-vehicle system 100 and the HUD apparatus 1 can measure the object distance between the object in the actual view and each of the vehicle and the point of view of the driver. Further, the position of the object in the space can also be calculated from the object distance on the basis of the positional information of the own vehicle. Further, in a case where the camera 3 has a certain form, it is also possible to measure a variable position of the point of view (the point p1). In such a case, a distance between the variable point of view and the object can be grasped. The HUD apparatus 1 executes visibility judgment and AR image processing (will be described later) by using distance information between the camera 2 and each of the vehicle, the point of view of the driver, and the object.

The measuring function of the object distance or the position as described above can be realized by various kinds of known means. There is the following, for example. A dedicated distance sensor included in the sensor unit 108 may be used. For example, by measuring a time until light emitted from the sensor shines on the object and returns, the object distance can be calculated from the time. Further, in a case where one camera 2 is included in the vehicle exterior photographing unit 102, the position of the object in the image of the camera 2 and information of other sensors are used to acquire the object distance by calculation. Further, in a case where two cameras 2, that is, a stereo camera is provided in the vehicle exterior photographing unit 102, two right and left images of the two cameras 2 are used to acquire the object distance by calculation. The calculation for the object distance may be executed in the ECU 101 or the HUD apparatus 1.

The vehicle exterior photographing unit 102 may use a monocular camera composed of a set of a camera lens and a light receiving element as the camera 2, for example. In this case, it is possible to realize the AR display apparatus with low cost. The vehicle exterior photographing unit 102 or the HUD apparatus 1 uses an image of the monocular camera and information of other sensors to measure the object distance by a known calculating process. The vehicle exterior photographing unit 102 may use, as the camera 2, a stereo camera composed of two sets of camera lenses and light receiving elements. The vehicle exterior photographing unit 102 or the HUD apparatus 1 uses the images of the two cameras to measure the object distance by the known calculating process.

A telephoto lens or a wide-angle lens may be used as the lens of the camera 2. In a case where the telephoto lens is used, an object located at a position far from the driver can be photographed, whereby it is possible to increase objects each of which becomes a candidate for the AR. In a case where the wide-angle lens is used, a wide area can be photographed by the one camera 2, whereby it is possible to realize the vehicle exterior photographing unit 102 with low cost. A polarization filter may be provided in front of the lens of the camera 2 or the light receiving element. This makes it possible to prevent detection accuracy from being lowered due to unnecessary reflected light from the object.

AR Display Apparatus and On-Vehicle System (3)

The control unit 10 includes, as respective units that are realized by software program processing and the like of the microcomputer, an image selection unit 11, a visibility judgment unit 12, an AR image generator unit 13, an image processing unit 14, and the AR display unit 15. The AR image generator unit 13 includes the image processing unit 14. Each of the units may be realized by a dedicated circuit (for example, an FPGA).

The video data photographed by the camera 2 are inputted from the video data storage unit 103 to the image selection unit 11. The image selection unit 11 selects an area of a predetermined object (which may be referred to as an "object area" or an "object image") from each image frame of the video data on the basis of an image analyzing process and the like to extract it as image data. The predetermined object is photographed in the image. In other words, the processing function of the image selection unit 11 is a processing function to partition the whole area of the image into pixel regions each corresponding to a unit that can recognized as an object. The image selection unit 11 stores the image data of the selected and extracted object area in a memory in the control unit 10 or the video data storage unit 103.

The image selection unit 11 executes, as the image analyzing process, extraction and judgment of an amount of characteristic from the image, or image matching. The image selection unit 11 compares the extracted amount of characteristic with the feature information or the definition information of the object, which is set in advance to judge and extract an object area from similarity. Alternatively, the image selection unit 11 compares an area in the image with the reference image set in advance as an image matching process, and judges and extracts an object area from similarity.

In the first embodiment, at least a signboard is contained as a target object. The feature information and the definition information of a predetermined object are set in the HUD apparatus 1 in advance. For example, a shape such as a quadrangle, a size range, color of a signboard surface, and characters and iconography described on the signboard surface are defined as the feature information and the definition information of the signboard. The feature information and the definition information of the object may be geometric figure such as a rectangle, a polygon, or an ellipse. They may be a minute area of a pixel unit, or a reference image.

For example, in a case where the target object is a signboard and there is a quadrangular area partitioned by a boundary line extracted from the inside of the image, the image selection unit 11 may extract the area as the object area of the signboard. Alternatively, the image selection unit 11 may extract, as the object area of the signboard, a right rectangle obtained by taking and simplifying the area so as to include the quadrangular area corresponding to the signboard. In a case where the object area is set to a simple rectangle, for example, high-speed processing is possible. In a case where the object area is set to a minute pixel region of a pixel unit, for example, it is possible to extract the area finely, and it is possible to reduce noise (influence of the other object around the object), whereby finer AR presentation is possible. These viewpoints may be designed with balance appropriately.

Note that by using a user setting function (will be described later), user setting for a type of the target object is possible. For example, setting to set the target object to only a signboard is possible.

In order to display an AR image regarding the target object, the visibility judgment unit 12 judges a degree of quality (high or low) of visibility of the driver on the basis of the video data and the image data of the object area. This visibility contains visibility of the object in the actual view itself, and visibility of the AR image associated with the object. The visibility judgment unit 12 calculates a visibility index value by a predetermined system for the judgment. The visibility judgment unit 12 determines, as an AR display target or an AR image processing target, an object, which is thought to be hardly recognized visually by the driver, of objects extracted from the inside of the image on the basis of the visibility index value. The visibility judgment unit 12 determines a way of AR display of the object in accordance with the visibility index value.

The AR image generator unit 13 generates an AR image with higher visibility than that of the original object by using image processing of the image processing unit 14 so that the driver easily recognizes the target object visually. The AR image generator unit 13 generates an AR image on the basis of a judgment result of visibility regarding the target object, input video data or the image data of the object area, and the original data for the AR image. At that time, the AR image generator unit 13 uses the image processing unit 14 as needed to execute processing of an image area of the target object, and generates the AR image by using the image after processing. The AR image generator unit 13 refers to and uses data of the DB in the DB unit 109 as the original data as needed. Alternatively, the AR image generator unit 13 refers to and uses the vehicle information from the ECU 101 and the sensor unit 108, the map information from the car navigation unit 106, and external information via the communication unit 104.

The image processing unit 14 executes image processing, such as processing or conversion, for heightening visibility regarding the target object and AR image on the basis of the judgment result of visibility, the input video data or the image data of the object area, and the original data. As the processing, for example, an enlarging process, a sharpening process, a contrast changing process, a color tone changing process, an attitude changing process, OCR processing and the like are cited. The image processing unit 14 has a function to execute each kind of the processing. In the processing, an object image may be processed to become an AR image, or an original AR image may further be processed to become an AR image. Note that only a function for a part of the processing may be provided for implementation.

The AR display unit 15 generates AR data for the AR display on the basis of data on the AR image generated by the AR image generator unit 13, and outputs the AR data to the display unit 20, thereby causing the display unit 20 to execute the AR display. The AR data contain information on a display position and a display size of the AR image in the screen 5. Herewith, the AR image associated with the object is superimposed and displayed at the display position in the screen 5 as a virtual image in a state of the display size with a predetermined enlargement ratio. The AR image associated with the object is visually recognized by the eyes of the driver. The AR display unit 15 also executes a converting process to associate a coordinate system for a flat surface that is a conceptual screen on the information processing with a coordinate system for a curved surface that is the screen 5 on the front shield 9.

The HUD apparatus 1 also includes an optical character recognition (OCR) function. The image selection unit 11 recognizes characters (such as alphanumeric characters, kana-kanji, or symbols) from an input image or an object image therein by means of the OCR processing to acquire character data. The image selection unit 11 then stores them in the memory of the control unit 10 or the video data storage unit 103. The image selection unit 11 may extract predetermined iconography or mark, for example, a traffic sign or trademark from the input image.

The respective units such as the image selection unit 11 are realized by the process of the control unit 10 in the HUD apparatus 1. However, it is not limited to this, and any method is possible. A part or all of the respective units may be realized by hardware or software outside the HUD apparatus 1.

Main Processing Flow

Figure 3:
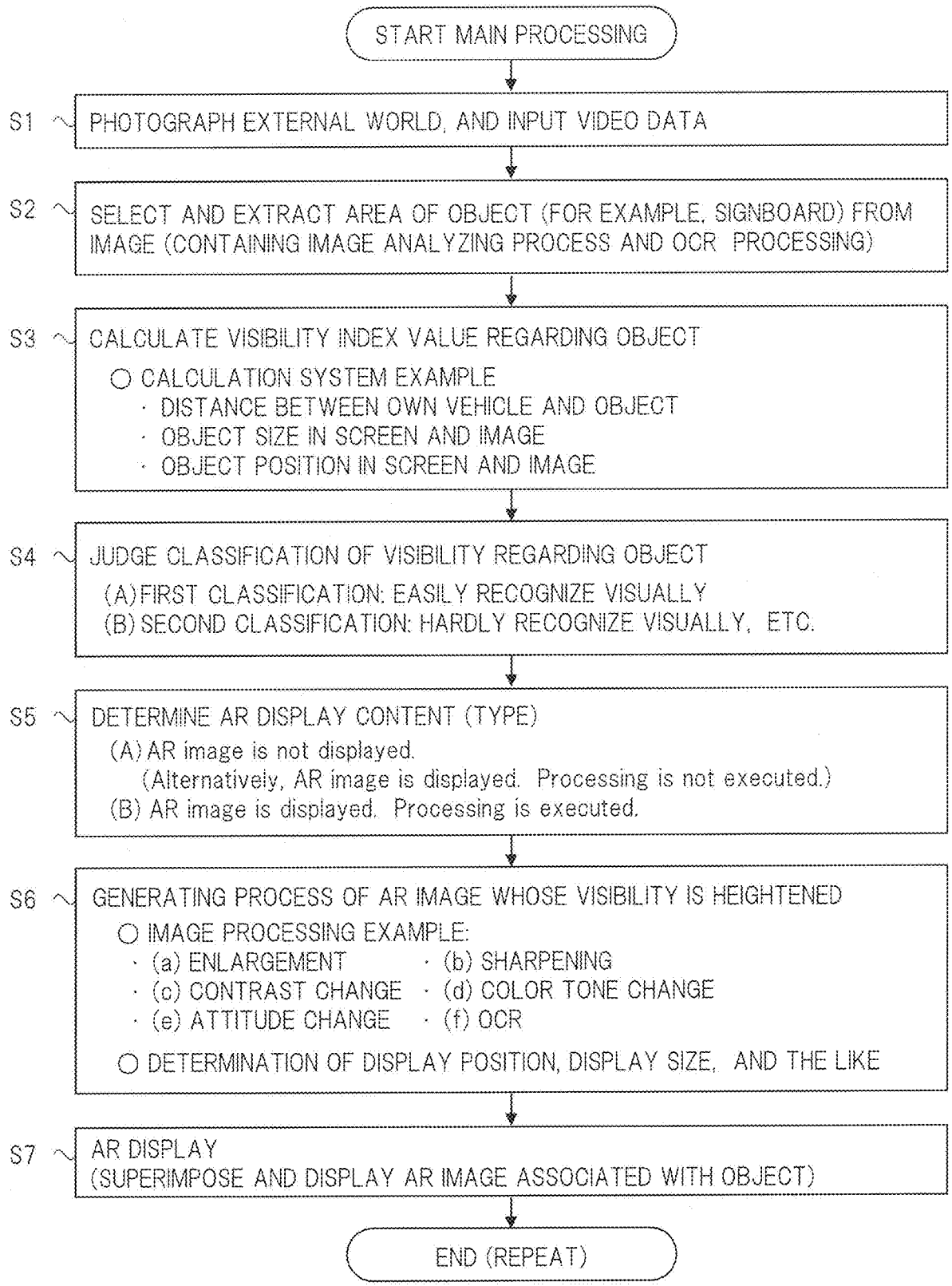
FIG. 3 is a view illustrating a main processing flow according to the first embodiment.

FIG. 3 illustrates a main processing flow in the HUD apparatus 1 that is the AR display apparatus according to the first embodiment. FIG. 3 includes Steps S1 to S7. Hereinafter, the main processing flow will be described in order of Steps.

(S1) At a normal time, the control unit 10 of the HUD apparatus 1 sets the camera 2 of the vehicle exterior photographing unit 102 to an ON state in an ON state of the AR function, and stores video data of an external world, which are photographed by the camera 2 of the vehicle exterior photographing unit 102, in the video data storage unit 103. The control unit 10 inputs an image of the video data from the video data storage unit 103 in turn.

Note that, as a modification example, the ECU 101 of the on-vehicle system 100 or the like may control the operation of the camera 2. Further, the video data may be inputted to the HUD apparatus 1 directly from the camera 2.

(S2) The image selection unit 11 selects and extracts an area of an object (for example, a signboard) as a predetermined target from the image of the video data inputted at S1. The image selection unit 11 stores the selected and extracted image data of the object area in the memory of the control unit 10 or the video data storage unit 103.

Further, when the object is extracted from the image at S2, the image selection unit 11 extracts an amount of characteristic of the object on the basis of the image analyzing process. As examples of the amount of characteristic, there are a shape, a size, color, brightness, contrast, and unsharpness (frequency component).

Further, in a case where characters can be recognized at S2 by subjecting the image or the extracted object area to the OCR processing, the image selection unit 11 may extract character information for the characters.

Figure 5:
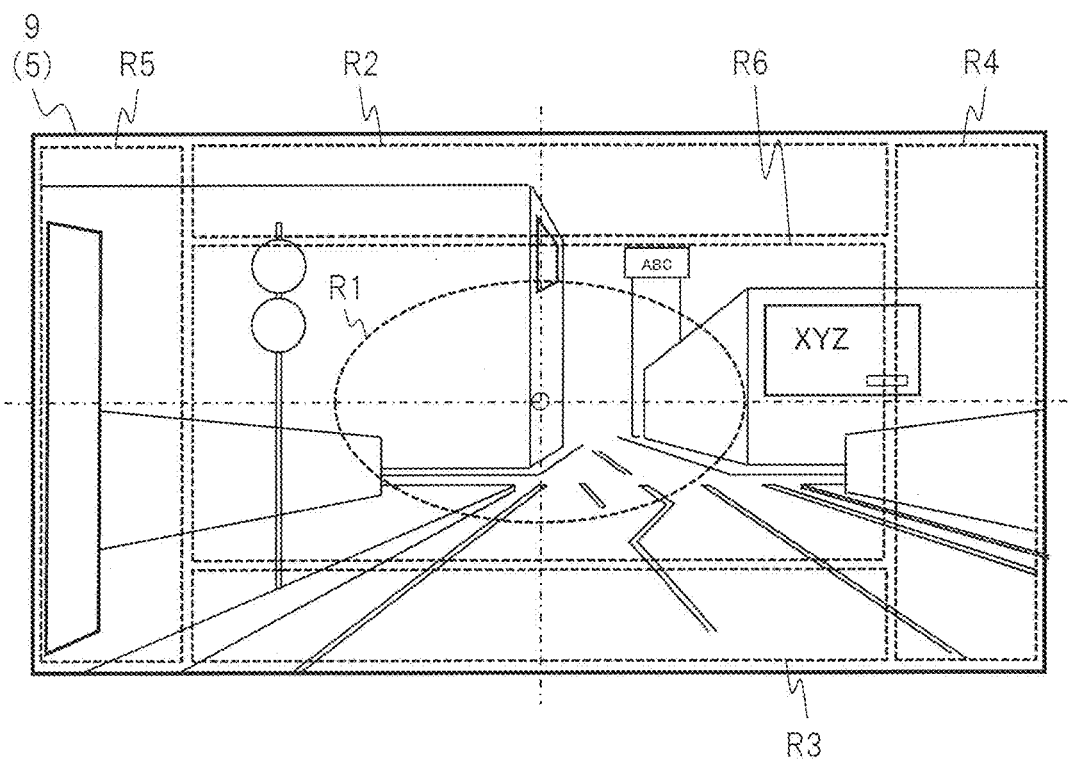
FIG. 5 is a view illustrating an example of areas in the screen according to the first embodiment.

In the first embodiment, the image selection unit 11 extracts the object area from the whole AR displayable area of the screen 5 and the whole image of the camera 2. It is not limited to this, and any method is possible. A partial area of the screen 5 and the whole image may be set as an extraction target area. For example, FIG. 5 illustrates a setting example of a partial area R6.

Further, in the first embodiment, the image selection unit 11 extracts object areas up to a predetermined number from the inside of the image of the camera 2 at the same time. At that time, for example, an object positioned near the own vehicle may be extracted in a preferential manner, or an object positioned near a central point of the screen 5 may be extracted in a preferential manner.

(S3) The visibility judgment unit 12 calculates an index value of the object extracted at S2 for judging a degree of visibility when viewed from the driver by means of a predetermined system. This index value is defined as a "visibility index value" (visibility index value) for explanation. This index value is calculated so that the more easily the object is recognized visually, the higher the index value becomes, and the more hardly the object is recognized visually, the lower the index value becomes, for example. The visibility judgment unit 12 uses feature information extracted from the image and the information from the sensor in the sensor unit 108, for example, to calculate this index value. In a calculation system according to the first embodiment, this index value is calculated by using at least one of the object distances, or a position and a size of the object in the screen 5 and the image. The object distance is a distance between the camera 2 or the point of view of the own vehicle as described above and the target object. For example, the relatively larger the object distance becomes, the lower the index value becomes. Further, for example, the relatively smaller the object size in the image becomes, the lower the index value becomes. For example, the index value becomes lower as the position of the object in the image becomes a peripheral position relatively far from the central point.

(S4) The visibility judgment unit 12 judges whether the target object is easily recognized visually or hardly recognized visually when viewed from the driver on the basis of the visibility index value at S3, and classifies the target object. For example, the visibility judgment unit 12 compares the visibility index value with a threshold value, and classifies the target object into any of some cases. At least two kinds of classifications are provided. In the first embodiment, first classification and second classification are provided (will be described later with reference to FIG. 7). The first classification roughly means that it is judged to easily recognize the object visually. The second classification roughly means that it is judged to hardly recognize the object visually. The HUD apparatus 1 executes the classification by using a range of a threshold value regarding each of the object distance and the object size.

For example, in a case where the object distance is used and a distance between the own vehicle and the object is larger than the threshold value, it is possible to estimate that visibility of the driver is low. Further, for example, in a case where the object size is used and the size of the object area in the image is smaller than the threshold value, it is possible to estimate that the object is positioned far from the own vehicle, and this makes it possible to estimate that visibility of the driver is low.

For example, the HUD apparatus 1 sets, as a threshold value, in advance an image size (a length by pixel unit), at which it becomes difficult for the driver to recognize the object visually, in accordance with eyesight of the driver and viewing angle characteristics of the lens of the camera 2. This threshold value may be set by magnification or the like with respect to a standard image size of each object. The HUD apparatus 1 compares the size of the object area extracted at S2 with the threshold value of the image size, judges and classifies whether the object can be recognized visually or not.

The number of classifications of the visibility described above is not limited to two. It may be set to three or more classifications (will be described later with reference to FIG. 8) in accordance with levels of easiness to recognize visually or difficulty to recognize visually. For example, second classification and third classification are provided in accordance with a first level and a second level of the difficulty to recognize visually.

(S5) The visibility judgment unit 12 determines whether AR display regarding the target object is to be executed or not, an AR image, whether processing is to be executed or not, and the content of the processing (which is described as a type) on the basis of the classification of a visibility judgment result at S4. For example, in a case where the classification is the first classification, it is determined that the AR display is not to be executed as a first type. In a case where the classification is the second classification, it is determined that the AR display is executed together with image processing as a second type.

At S5 and S6, basic rules regarding the AR display (will be described later) are also considered. For example, as the basic rules, AR image display is avoided in a central area of the screen 5. Further, as the basic rules, the number of AR images displayed in the screen 5 at the same time is restricted up to the predetermined maximum number.

(S6) The AR image generator unit 13 generates an AR image regarding an object to be displayed as AR on the basis of determination of the type at S5. At that time, the AR image generator unit 13 uses the image processing unit 14 to execute image processing for heightening visibility regarding the object whose visibility is low as the second classification and the AR image. The image processing unit 14 applies the enlarging process or the like according to the type as the image processing for the object area, and outputs image data after processing. The AR image generator unit 13 generates the AR image by using the image data after processing.

The image processing unit 14 applies, as the processing, at least one of the enlarging process, the sharpening process, the contrast changing process, the color tone changing process, the attitude changing process, or the OCR processing. For example, in case of the enlarging process, the image processing unit 14 enlarges an image of the object area to form the AR image. For example, in case of the OCR processing (in other words, a converting process into a character image), the image processing unit 14 extracts character information from the object area by the OCR processing, selects font, a size, and color of its character so as to become an objective level of visibility, and generates a character image to become an AR image. Note that in this OCR processing, the character information extracted by the image selection unit 11 at S2 may be used.

The AR image generator unit 13 may subject the original data to processing by the image processing unit 14 to generate the AR image. For example, character information or iconography described on a signboard surface is acquired as the original data. The image processing unit 14 enlarges a size of the character or the iconography to create an AR image with high visibility.

Further, at S6, the AR image generator unit 13 determines a display position and a display size of the generated AR image in the screen 5 on the basis of a predetermined system (will be described later). For example, in case of a fixed position system, a position of a vacant space in a predetermined fixed area of the screen 5 (for example, a lower side area R3 of FIG. 6) is selected as the display position. In case of a neighboring position system, a position of a vacant space in a neighboring area of the target object and outside the central area in the screen 5 is selected as the display position. The display size of the AR image is basically changed in accordance with a change in the object distance.

Further, in order to heighten visibility of one or more AR image in the screen 5, at S6, the AR image generator unit 13 may adjust a display position and a display size of each AR image, and the number of AR images to be displayed. Visibility of the driver is not only related to visibility regarding an individual object and its AR image, but also related to comprehensive visibility regarding a plurality of objects and a plurality of AR images when the screen 5 is viewed. For that reason, the HUD apparatus 1 also considers the comprehensive visibility of the screen 5 to determine an AR image. For example, in a case where there is a plurality of AR images for a plurality of objects with the second classification, display positions and display sizes of the respective ones and the number of AR images to be displayed are determined in order to heighten their comprehensive visibility. For example, in a case where display positions of a plurality of AR images are crowded near each other with respect to the display positions, an interval between any two AR images is adjusted so that the two AR images are separated from each other to an extent to be not overlapped as much as possible. For example, the number of AR images to be displayed is limited so as to become any number of AR images in the screen 5 up to the predetermined maximum number at the same time. During the limitation, the number of AR images to be displayed is determined in view of the object distance, or definition of priority of the object and the AR image (priority of a traffic sign is higher than that of a signboard). This makes it possible to suppress the amount of information of the AR images in the screen 5, whereby the driver can easily recognize the object and the AR image.

(S7) The AR display unit 15 uses data on the AR image generated at S6 and information for their control to create AR data for superimposing and displaying the AR image associated with the target object in the screen 5, and outputs them to the display unit 20. The AR display unit 15 executes conversion of the data on the AR image on the screen of a rectangular plane at S6 so as to be associated with the curved screen 5 on the front shield 9. The display unit 20 superimposes and displays the AR image in the screen 5 in accordance with these AR data. The above processes are executed as a similar repetitive loop.

Screen and Image

Figure 4:
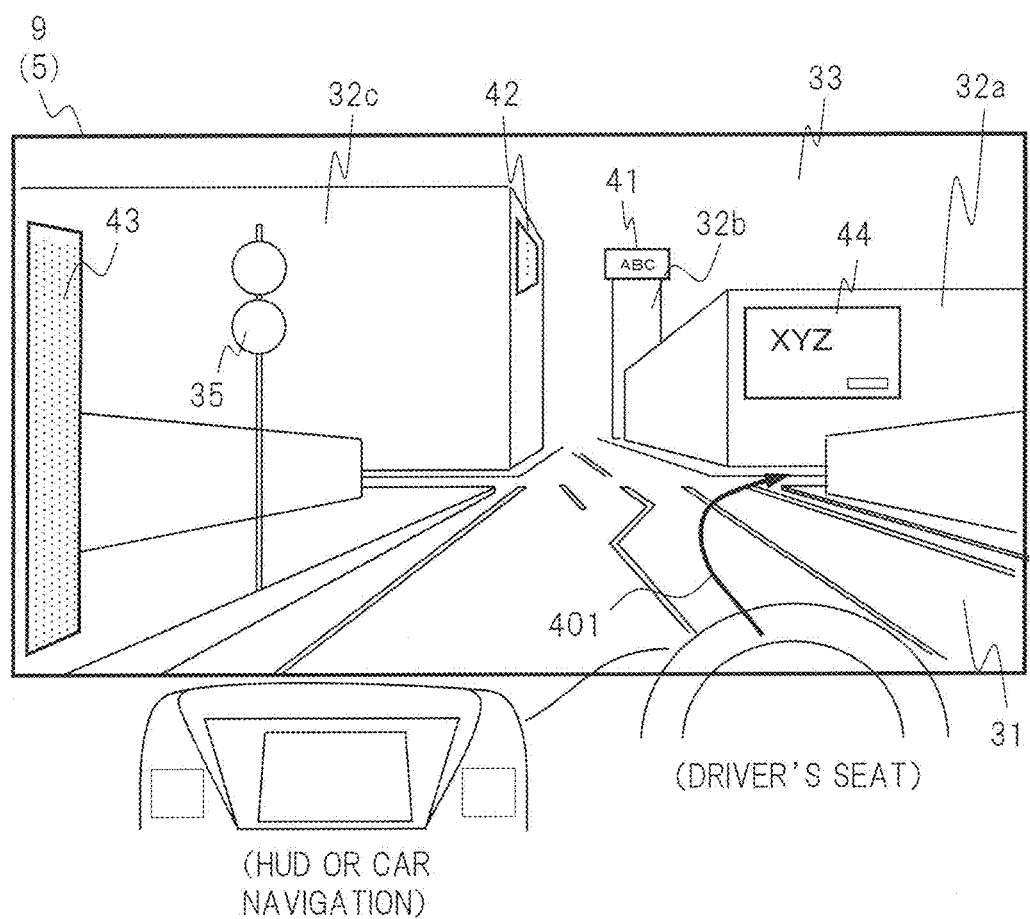
FIG. 4 is a view illustrating an example of a screen according to the first embodiment when viewed from a driver.

FIG. 4 schematically illustrates a state where the driver on a driver's seat in the vehicle views the screen 5 on the front shield 9 ahead. Note that each of the front shield 9 and the screen 5 actually has a curved surface viewed as a trapezoidal shape, but FIG. 4 illustrates a simplified rectangular plane. The screen 5 includes an AR displayable area. In the present embodiment, the whole screen 5 is the AR displayable area. In the screen 5, as an actual view corresponding to the field of view of the driver, a road 31 extending forward, buildings 32a, 32b, and 32c at sides of the road 31, and sky 33 of the background are transmitted and viewed. Further, in the actual view of the screen 5, there are a road sign 35, signboards 41 to 44, and the like as objects.

For example, with respect to each signboard, character or iconography such as shop guide or advertisement is drawn on a front face of a right rectangular plate. In accordance with a relationship between a position of the point of view of the driver and a direction and a position of the signboard, a shape of the signboard when the signboard is viewed from the driver is different. For example, the signboard 44 is in a state where a front face thereof is disposed substantially vertically with respect to the line of sight or a vehicle traveling direction. Therefore, the signboard 44 is viewed as a rectangle. For example, a front face of the signboard 41 is similarly viewed as a rectangle. However, since the object distance is comparatively far, it is viewed with a small size, whereby a described character and the like is hardly recognized visually. For example, the signboard 42 is disposed so that a front face thereof is directed to a direction near 90° with respect to a direction facing the road 31, the line of sight, and the vehicle traveling direction. The front face of the signboard 42 becomes oblique attitude with respect to the line of sight. For that reason, the signboard 42 is viewed as an area distorted into a trapezoidal shape. In a case where a signboard has such a distortion, the driver may hardly recognize it visually. Depending upon a relationship of positions or directions of the vehicle and an object, the object may not be able to be recognized visually at all. The signboard 43 is disposed at a position in the vicinity of a left side of the own vehicle, and similarly becomes the oblique attitude.

A signboard installed independently and a signboard installed on a building are included as signboards that become the target object. As types of information described on a front face o a signboard that becomes the target object, characters, and iconography (containing logo and the like) are contained. As examples of the described information, general advertisement, advertisement of a shop in a building, a guide sign, and a map are cited. The signboard may be digital advertisement signboard whose content is changed in accordance with time. The signboard is not limited to a signboard whose installation position is fixed, and may be a movable signboard, for example, a signboard mounted on a movable object.

Areas, Basic Rules, and System of Display Position

FIG. 5 illustrates areas and the like of the screen 5. As areas for explanation, a central area R1 positioned in the vicinity of the center of the screen 5, an upper side area R2 positioned in the vicinity of an upper side thereof, a lower side area R3 positioned in the vicinity of a lower side thereof, a right side area R4 positioned in the vicinity of a right side thereof, and a left side area R5 positioned in the vicinity of a left side thereof are provided.

In the first embodiment, the central area R1 is an area in which display of any AR image is to be avoided as the basic rules regarding the AR display. An ellipse is illustrated as the central area R1. However, the shape of the central area R1 is not limited to this, and can be set to a rectangle or the like. The central area R1 of the screen 5 is an area where the driver fixes his or her eyes while driving. This central area R1 is basically defined as an area where the AR display is not executed, or a preferentially used area for a predetermined important AR display for drive assist and the like. As one example of the important AR display, display regarding a road surface mark or a traffic light, display of an arrow indicating a traveling direction, display of speed limit, display of an inter-vehicle distance, display of caution about pedestrian or an oncoming vehicle, and display of warning are cited. This area is not limited to the central area R1. In a case where a sight line tracking function (will be described later) is provided, a sight line central area may be adopted. Setting of the basic rules is merely one example. As another setting example, it is cited that a rate to display an AR image in the screen 5 is set to a fixed rate or lower.

The HUD apparatus 1 according to the first embodiment executes AR display regarding the object such as a signboard. When a display position of the AR image is determined, the HUD apparatus 1 avoids the central area R1 as the display position as much as possible. Namely, the display position of the AR image of the signboard is basically determined to be a position outside the central area R1. This makes it possible to suitably present AR image information such as a signboard in a good visible state while preferentially securing drive assist or the like for traffic safety in the on-vehicle system 100. Note that depending upon a situation (for example, while the vehicle is traveling at low speed or is stopped), the AR display such as a signboard may be executed in the central area R1.

Some systems of determining the display position of the AR image in the screen 5 are possible, and the following systems are cited. When the display position and the display size of the AR image to be displayed to be associated with the object in the screen 5 are determined at S6 as described above, the AR image generator unit 13 determines them by using any one of the following systems.

As the system for the display position, (1) a fixed position system, (2) a neighboring position system, and (3) the same position system are provided.

In (1) the fixed position system, a fixed area for AR image display is provided in advance in the AR displayable area of the screen 5, but outside the central area R1. The upper side area R2 and the lower side area R3 illustrated in FIG. 5 are setting examples of the fixed area compatible with the fixed position system. The display position of the AR image is determined to be the inside of the fixed area. Note that, specifically, it may be set so that a different kind of AR image is displayed in each fixed area. For example, vehicle information is displayed in the lower side area R3, and information on a signboard is displayed in the upper side area R2.

In (2) the neighboring position system, the display position of the AR image is determined to be a position selected from the neighboring area of the target object. For example, a circular region with a predetermined radius distance is set temporarily by using the position of the target object as a central point. Any vacant position within the circular region and outside the central area R1 is selected as the display position of the AR image. Further, in particular, in a case where there is a vacant position at which there is no other object or AR image of candidate areas, the position is selected. For example, in a case where the target object is a signboard, a vacant position of an upper or side portion of the signboard, at which a background thereof is the sky 33, is selected as a display position thereof.

Further, in this system, a line connecting the object to the AR image (a lead line) may be displayed as a part of the AR image. Further, in a case where a display position of an AR image cannot be secured within an area comparatively near a position of an object in an image, a position far from the object by a certain distance or longer may be set to the display position, and a line connecting the object and the AR image may be displayed. By displaying the lead line, the driver can further recognize relevance between the object and the AR image.

In (3) the same position system, a display position of an AR image is set to the same position as a position of an object in an image. For example, the AR image may be superimposed and displayed so as to cover over the object, or an AR image like a frame that surrounds an outer shape of the object may be displayed. For example, the object is the sign 35 illustrated in FIG. 6. In order to enhance existence of the sign 35, a frame surrounding the sign 35 is displayed at the same position as the AR image.

AR Display Example

Figure 6:
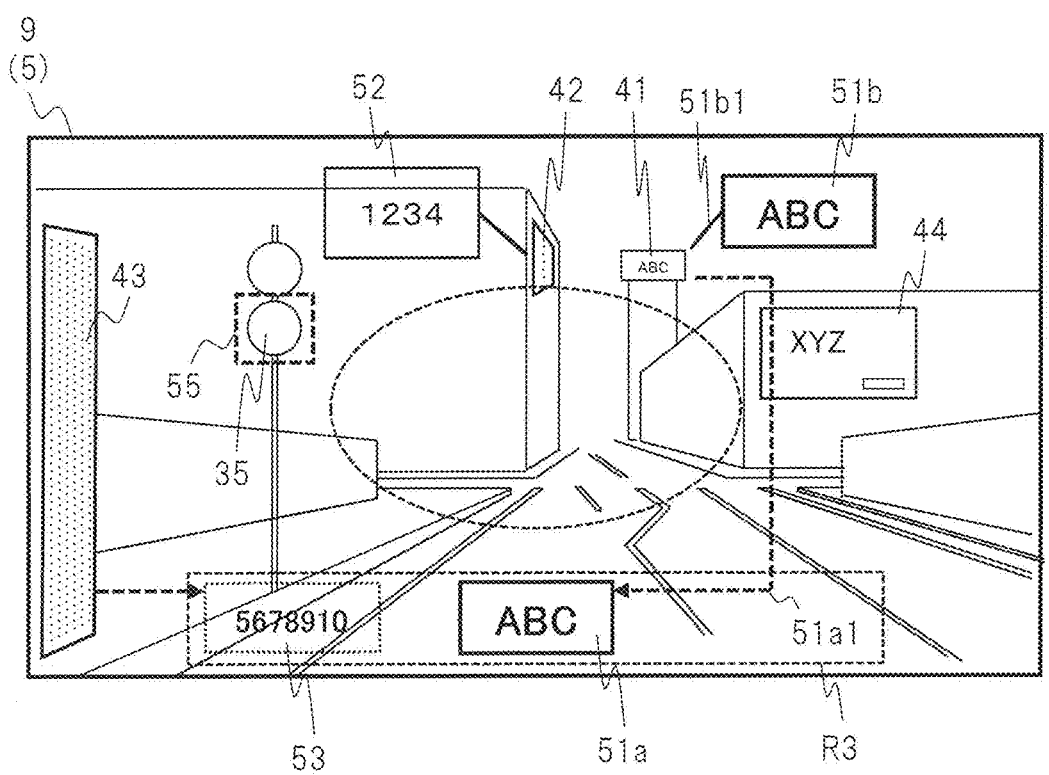
FIG. 6 is a view illustrating an example of AR display on the screen according to the first embodiment.

FIG. 6 illustrates an example of a display control of an AR image in the screen 5. In the present embodiment, display examples of AR images regarding the signboard 41 and the like are illustrated. First, the signboard 44 is judged to be sufficiently large and easily recognized visually. Therefore, an AR image thereof is not displayed.

An AR image 51a is a first display example regarding the signboard 41. In the fixed position system, it is an example in which an image of the signboard 41 is enlarged to become an easily recognizing visually state and displayed in the lower side area R3. Similarly, the AR image 51a may be displayed in the upper side area R2. Further, as illustrated in FIG. 6, the AR image 51a may be displayed so that a lead line 51a1 extending from the signboard 41 (for example, an arrow indicated by a broken line) is attached thereto. The lead line 51a1 is displayed so as to avoid the central area R1 and go around the central area R1. Further, a display size of the AR image 51a may be at least larger than that of the original object area of the signboard 41, and may become a predetermined size matched with a size of the lower side area R3 (for example, a vertical width).

An AR image 51b is a second display example regarding the signboard 41. Similarly, the image of the signboard 41 is enlarged to become an easily recognizing visually state and displayed at a vacant position within a range of a predetermined radius distance near the signboard 41 and outside the central area R1. Further, as illustrated in FIG. 6, a lead line 51b1 (for example, a solid line) may be attached to the AR image 51b and displayed so as to extend from the signboard 41. The lead line 51b1 is displayed so as to extend in a direction from the center of the screen 5 to the periphery thereof. Further, a display size of the AR image 51b is at least larger than that of the original object area of the signboard 41. Each of the AR image and the lead line may be an image with a balloon form. By attaching the lead line thereto, the driver can more easily recognize a relationship between the object and the AR image.

The signboard 42 is oblique attitude when viewed from the point of view of the driver, and is viewed as an area distorted into a trapezoidal shape. For that reason, the content described on a front face of the signboard 42 becomes hardly recognized visually. Similarly, an AR image 52 regarding the signboard 42 is an example in which a lead line is attached and displayed at a position near the signboard 42. The enlarging process and the attitude changing process are executed for the AR image 52 as the image processing. The attitude of the object area of the signboard 42 is changed so as to become a state of the front face thereof when viewed from the point of view. Namely, the original trapezoid is converted to become a right rectangle. This change in attitude allows the driver to easily recognize a described character on the front face of the signboard 42 visually.

Similarly, the signboard 43 is positioned at a left end of the screen 5 and the field of view, and is in an oblique attitude state. Therefore, the signboard 43 becomes hardly recognized visually. An AR image 53 regarding the signboard 43 is an example in which the AR image 53 is displayed in the lower side area R3.

In the first embodiment, like the example of the signboard 42, the function to display the AR image according to the attitude state of the object in the image is provided as one function. The HUD apparatus 1 judges visibility of the object according to the attitude state thereof when viewed from the point of view of the driver, selects and determines the content of the AR display. For example, in a case where a front face is in a attitude state in a direction substantially along the direction of the line of sight of the driver and the traveling direction of the own vehicle like the signboard 44, in other words, in a case where the object area in the image has a shape close to a right rectangle, it can be judged that it can be viewed relatively easily. In such a case, the visibility index value is calculated as a relatively high value.

On the other hand, in a case where a front face is in an oblique attitude state corresponding to a different direction that intersects the direction of the line of sight of the driver and the traveling direction of the own vehicle like the signboard 42, in other words, in a case where the object area in the image has a trapezoidal shape, it is possible to judge that it is relatively hardly recognized visually. Alternatively, in a case where a horizontal width of the object area (a length in a horizontal direction of the screen) is viewed so as to be narrow like the signboard 43, it is possible to judge that it is relatively hardly recognized visually. In such a case, the visibility index value is calculated as a relatively low value. Alternatively, in a case where a front face of a signboard is in a completely invisible attitude state, it is possible to judge that it cannot be recognized visually. Note that as a method of calculating the visibility index value, the visibility index value may be calculated by a method of calculating the attitude state of the object area, for example, an angle of a direction of the front face of the signboard or an angle or the like of an oblique side of a trapezoid in the image, and multiplying the angle or the like by the object distance as a coefficient. Alternatively, such calculation may be omitted, and classification may directly be executed in accordance with judgment of a shape, such as a trapezoid, when an object area is extracted from the inside of an image.

Image Processing (1)

Examples of the image processing by the image processing unit 14 are as follows. As image processing functions to heighten visibility of an object and an AR image, the image processing unit 14 has processing functions, such as (1) enlargement, (2) sharpening, (3) contrast change, (4) color tone change, (5) object attitude change, or (6) OCR.

(1) An enlarge processing function is a processing function in which in a case where an object positioned comparatively far from the camera 2 (or the corresponding vehicle and the driver) is photographed, an object area photographed with a small size in an image is enlarged to become a large size. For example, in FIG. 6, in a case where the signboard 41 positioned comparatively far from the camera 2 is extracted as an object area, the image processing unit 14 enlarges an image of the object area of the signboard 41 with a predetermined enlargement ratio. For example, a described character "ABC" of the signboard 41 is enlarged from a small state to become a large state.

(2) A sharpening processing function (in other words, sharpness change, edge enhancement) is a function to execute a process to sharpen an unsharped image by using a known technique. Note that a sharpening method may be a method of using a filter that enhances a gradation change, or a method of subjecting an image to Fourier transformation, resolving it into each frequency component, and removing a low frequency component, for example. The image processing unit 14 subjects an image of the signboard 41 (or the image after enlargement) to the sharpening process, for example. This makes it possible to reduce unsharpness of the described character of the signboard 41.

(3) A contrast change processing function is a function to execute a process to enhance contrast in an image with no gradation, on which strong light shines, by using a known technique. The image processing unit 14 subjects an image of the signboard 41 (or the image after enlargement) to a contrast changing process, for example. This makes it possible to heighten contrast between the described character of the signboard 41 and a background, whereby described character can easily be recognized visually.

(4) A color tone change processing function is a function to execute a process to change color tones in an image of an object, which is hardly viewed due to similar color to that of an actual view, by using a known technique. The image processing unit 14 subjects an image of the signboard 41 (or the image after enlargement) to a color tone changing process, for example. The image processing unit 14 compares color of an object area of the signboard 41 with color of a background area (building, sky, and the like) around it on the basis of a photographed image, for example, and judges whether they are similar color (or the same color tone) or not. In a case where they are similar color, the image processing unit 14 changes a color tone of the object area so as to have a sufficient difference with a color tone of the background area. This makes it possible to easily recognize the area of the signboard 41 visually.

(5) An object attitude change processing function is a function to a process to convert, in a case where a target object is in an inclined attitude state from a photographed image when viewed from a point of view of a driver, the attitude so as to become a state where its object area is a front face by using a known technique. The image processing unit 14 judges an attitude state from a shape of the object area in the image. In a case where the attitude is oblique (for example, its shape is a trapezoid), this conversion is executed. The image processing unit 14 executes the conversion by using known projection conversion so that the attitude of the object area becomes the front face, for example, the trapezoid becomes a right rectangle. For example, the signboard 42 illustrated in FIG. 6 is converted from a trapezoidal image to aright rectangular image.

(6) An OCR processing function is a function to extract characters from an object area in an image by using a known technique and generate a character image by using its character information. The extracted character information is set to original data for generating an AR image. The image processing unit 14 may subject the object area in the image to OCR processing to extract the characters. For example, in a case where a character "ABC" can be recognized from an object area of the signboard 41 by the OCR processing, the image processing unit 14 may enlarge the character by an enlarging process so as to have a sufficient size. Alternatively, the image processing unit 14 may subject the image of the object area after enlargement by the enlarging process to the OCR processing to extract the character. For example, in a case where the character can be recognized from the image corresponding to the AR image 51b after enlargement by the OCR processing, the image processing unit 14 may replace the AR image by the image based on the recognized character.

Image Processing (2)

The following is cited as another processing example related to the image processing and the like.

(1) The image selection unit 11 of the HUD apparatus 1 analyzes frequency components of an object area in an image. In a case where there is only a low frequency component from its analysis result, the object image has unsharpness (in other words, a degree of unsharpness is large), whereby it is possible to judge that it is hardly recognized visually. The visibility judgment unit 12 can calculate a visibility index value on the basis of the frequency component. In such a case, the HUD apparatus 1 uses the image processing unit 14 to subject the object area to a process such as sharpening or contrast change as the image processing. Specifically, this process may be as follows. While driving, the HUD apparatus 1 acquires an object area of an image photographed at a certain time and the object area of the image photographed at a time after the certain time at a position where the object approaches the own vehicle, and compares frequency components thereof after uniforming sizes of both object images. On the basis of its comparison result, in a case where a change in the frequency component is comparatively small, it is possible to judge that there is only a low frequency component (or there is unsharpness) in the object area.

(2) The HUD apparatus 1 judges brightness of each of an object area of an image and its peripheral area (a pixel value or the like corresponding to the brightness). In a case where a brightness value of the object area is relatively low (dark), or in a case where it is relatively high (bright), the visibility judgment unit 12 can judge that it is hardly recognized visually. In this case, as the image processing, an offset value is added to or subtracted from the brightness of the object area. Herewith, the object area and its peripheral area are adjusted so as to produce a difference of brightness, whereby visibility can be heightened.

(3) The HUD apparatus 1 generates histogram regarding brightness of an object area of an image. When the histogram is replaced by a data signal that is treated in an AR image generating process and an image processing, the HUD apparatus 1 reconstitutes the histogram so as to heighten contrast. For example, during image analysis, the image selection unit 11 converts a range from the minimum value to the maximum value of brightness of the object area so as to be assigned into a range from the minimum value to the maximum value that can be expressed by the data signal to interpolate intermediate values. This makes it possible to heighten contrast, whereby the feature information of the object can be detected easily, and visibility can also be judged easily.

AR Display Control Based on Visibility (1)

FIG. 7 illustrates a table in which classifications of visibility at S4 and determination of the AR display content at S5 in FIG. 3 are organized as a first example of the AR display control according to the first embodiment. The first example is a control example in which the AR display content is classified into two kinds in accordance with an object distance and the like. In a table of FIG. 7, as rows, classification, an image in the vicinity of a signboard, visibility of a driver, an object distance, an object size, VI: visibility index value, an AR display type, and an AR image are indicated from top to bottom. The classification indicates (A) first classification and (B) second classification from left.

With respect to (A) the first classification, in an image, a rectangle of a front face of the signboard 41 is photographed to be relatively large. For that reason, the driver comparatively easily recognizes a described character of the signboard 41 visually. The object distance between the driver and the signboard 41 as the object is relatively near (or small), and the object size is relatively large. The visibility index value VI is within a first range on the basis of the object distance and the object size, and is calculated as a relatively high value. The first range is expressed as VI≥H1 by using a threshold value H1. Since the visibility index value VI is within the first range, the AR display type is set to the first classification (the first type). In this AR display type, the object is displayed as it is, and an AR image is not displayed. Alternatively, the AR image may be displayed so as to be associated with the object. In such a case, the image processing is not executed. By not displaying the AR image, the amount of information to be presented to the driver through the screen 5 can be reduced, and this makes it possible for the driver to recognize the other AR image and the other object easily.

With respect to (B) the second classification, in an image, the rectangle of the front face of the signboard 41 is photographed to be relatively small. For that reason, the driver comparatively hardly recognizes the described character of the signboard 41 visually. The object distance between the driver and the signboard 41 is relatively far (or larger), and the object size is relatively small. The visibility index value VI is within a second range on the basis of the object distance and the object size, and is calculated as a relatively low value. The second range is expressed as H1>VI by using the threshold value H1. Since the visibility index value VI is within the second range, the AR display type is set to the second classification (the second type). In this AR display type, an AR image of the object is displayed. At that time, first processing is subjected to the object area to generate the AR image. As the first processing, there is an enlarging process, for example. The AR image is an enlarged image of the area of the signboard 41. As the other processing, one obtained by combining the processes (2) to (5) described above may be applied thereto.

AR Display Control Based on Visibility (2)

FIG. 8 similarly illustrates a second example of the AR display control as a modification example of the first embodiment. The second example is a control example in which the AR display content is classified into three kinds in accordance with an object distance and the like. In a table of FIG. 8, classifications indicate (A) first classification, (B) second classification, and (C) third classification from left. In FIG. 8, the second classification of FIG. 7 is further partitioned into second classification and third classification in accordance with a level of difficulty to recognize visually.

(A) the first classification is similar to the first classification of FIG. 7. Note that the threshold value H1 may be a different value. For example, a driver can clearly recognize a described character of the signboard 41 visually, and can easily recognize it visually.

With respect to (B) the second classification, in an image, the rectangle of the front face of the signboard 41 is photographed to be a relatively medium degree of size. For that reason, by fixing his or her eyes thereto, the driver can visually recognize a described character of the signboard 41. However, it is comparatively hardly recognized visually, and the second classification correspond to the first level of difficulty to recognize visually. Each of the object distance and object size is a relatively medium degree. The visibility index value VI is calculated on the basis of the object distance and the object size as a value of a relatively medium degree in a second range. The second range is expressed as H1>VI≥H2 by using the threshold values H1 and H2. Since the visibility index value VI is within the second range, the AR display type is set to the second classification (the second type). In this AR display type, an AR image of the object is displayed. At that time, first processing is subjected to the object area to generate the AR image. As the first processing, there is an enlarging process, for example. The AR image is an enlarged image of the area of the signboard.

With respect to (C) the third classification, in an image, the rectangle of the front face of the signboard 41 is photographed to be relatively quite small. For that reason, the driver cannot recognize the described character of the signboard 41 visually or hardly recognizes it visually. The third classification corresponds to the second level of difficulty to recognize visually. The object distance is relatively far (or large), and the object size is relatively small. The visibility index value VI is calculated on the basis of the object distance and the object size as a relatively low value in a third range. The third range is expressed as H2>VI by using a threshold value H2. Since the visibility index value VI is within the third range, the AR display type is set to the third classification (the third type). In this AR display type, the AR image of the object is displayed. At that time, second processing is subjected to the object area to generate the AR image. As the second processing, the OCR processing is used, for example, in addition to the enlarging process. The AR image is created by using character information that can be recognized by OCR. As the other processing, one obtained by combining the processes (2) to (5) described above may be applied thereto.

Note that the AR image may not be displayed in a case where the characters cannot be recognized by the OCR. Alternatively, in a case where the character cannot be recognized by the OCR, as will be described later, a process to retrieve information in the DB in the DB unit 109 may be executed. In such a case, for example, object information on the target object (for example, the signboard 41) is retrieved from the DB by using positional information of the object (a relative position from the own vehicle), and the AR image is created by using object information of the retrieval result.

Note that when the visibility judgment unit 12 calculates and judges the VI value as described above, the predetermined maximum value and the predetermined minimum value are used. In a case where the distance or the size of the object is too large or too small, it is judged that it is outside a range of the classifications, and it is set to be not a process target. Further, the threshold value H1 regarding the VI may be a fixed setting value for implementation, or can be set variably by the user via the user setting function. For example, the threshold value H1 may be determined and set in accordance with eyesight of the driver. For example, in case of a person with good eyesight, the threshold value H1 is set to a comparatively low value. In case of a person with relatively bad eyesight, the threshold value H1 is set to a comparatively high value. Herewith, with respect to objects positioned at the same distance from the driver, the object is classified into the first classification for the former person because the VI value becomes the threshold value H1 or more, while the object is classified into the second classification for the latter person because the VI value becomes less than the threshold value H1.

User Setting Function

The AR display apparatus according to the first embodiment includes a user setting function regarding the AR function. In this user setting function, setting of a type regarding the AR function and setting of an AR information category are possible. By using the user setting function, the user can select and set information that the user wants to acquire and display preferentially. The HUD apparatus 1 displays the information of the selected category with the selected type of AR function on the basis of the user setting as an AR image. The limited AR information desired by the driver is presented in the screen 5. Therefore, the driver can easily recognize the desired AR information in the screen 5 visually. Note that these are not limited to the user setting, and they may be configured as fixed setting for implementation.

FIG. 9 illustrates an example of a user setting screen. For example, the HUD apparatus 1 displays the user setting screen on an operation panel as hardware, and allows setting in accordance with a user input operation. An item "setting of AR function type" and an item "setting of AR information category" are provided in the screen illustrated in FIG. 9. Items such as "drive assist", "navigation", "traffic sign", "signboard", or "building" are provided in the item "setting of AR function type", for example. The user can select any item and turn the item ON/OFF. For example, the item "signboard" is set to an ON state. This causes a function for executing AR display for a signboard as a target object to become an effective state.

In the item "setting of AR information category", a category of AR information, which becomes targets acquired and displayed in the AR function, can be set. Items such as "person (category A)", "spot (category B)", "situation (category C)", or "time (category D)" are provided in this item, for example. The user can select any item and turn the item ON/OFF. For example, the item "spot (category B)" is set to an ON state. This causes information on spots to be provided as AR images with respect to the AR function of the type selected above (for example, the item "signboard").

The category A indicates a "person". A name, an address, and a telephone number are cited as the information content. Note that from a viewpoint of privacy and the like, a target person can be set and limited to a person such as a set acquaintance of the driver, a person who discloses information, and the like. The category B indicates a "spot". A convenience store, a gas station, a parking lot, a hospital, a lavatory, a restaurant, his or her home, a shop, a tourist spot, and a station are cited as the information content. The category C indicates a "situation". Weather, a surface condition, traffic congestion, an empty space in a parking lot, a traffic accident, construction, and a shop queue are cited as the information content. The category D indicates "time". A waiting time, an opening time, and a closing time of a shop, a required time, a passage time, and an arrival time of train are cited as the information content. Moreover, ON/OFF setting is separately possible for each of information items in each category.

In the first embodiment, a signboard is mainly used as the target object. By setting a spot of the category B, what signboard is particularly a target of a group of signboards can be set. For example, in a case where only an item "restaurant" is set to an ON state, AR images regarding ones corresponding to the signboard for the restaurant of signboards in the screen 5 and the image are displayed preferentially.

Further, in a case where a passenger is in the vehicle, the passenger is allowed to operate the HUD apparatus 1 and the like to select any information category described above. The HUD apparatus 1 displays the AR images to be switched in accordance with the selection operation.

Effects and the Like

As described above, according to the AR display apparatus of the first embodiment, it is possible to heighten visibility of the video containing the object and the AR image thereof by the driver, whereby it is possible to realize suitable AR presentation. When an AR image regarding an object such as a signboard is to be presented, it is possible to present even an object that is hardly recognized visually as an AR image that is easily recognized visually. The driver can understandably recognize an object such as a signboard and an AR image thereof. This allows the driver to acquire information regarding the object such as a signboard, which the driver wants to know. The driver can also decipher the described character of the signboard easily. In the first embodiment, the presentation content of the AR image information is switched in accordance with a degree of easiness to recognize an object visually from the driver, that is, the visibility index value. This makes it possible to execute suitable AR presentation to the driver. The AR image is presented with the different content in accordance with the degree of visibility, whereby it is possible to suitably set visibility in the whole screen 5.

Modification Example

The configuration of each of the HUD apparatus 1, which is the AR display apparatus according to the first embodiment, and the on-vehicle system 100 is not limited to one described above, and any configuration is possible. The following is cited as a modification example. Respective modification examples can be combined.

(a) In the first embodiment, the AR display is realized as the AR display apparatus by using the HUD apparatus 1. However, it is not limited to this, and any method is possible. AR display may be realized by using a head mounted display (HMD) apparatus. Namely, the AR display apparatus may be realized as a projection HMD apparatus or its system. The projection HMD apparatus is worn on a head by the user and used. In case of this form, an AR image is superimposed onto a transparent actual view on a screen of the HMD apparatus in front of the user and displayed. Further, for example, vibration of the vehicle may be detected from information of an acceleration sensor included in the HMD apparatus. The AR image may be controlled to vibrate in a range where the user does not feel uncomfortable due to car sickness so as to cancel the vibration of the vehicle. Further, in the on-vehicle system, the AR display may be realized by a method other than the HUD or the HMD. Further, a similar AR display may be realized in a system other than the vehicle (for example, a game machine fixedly installed in the facility).

(b) The AR display apparatus according to the first embodiment can generate an AR image by using information from an existing on-vehicle car navigation unit 106 as original data of an external input. However, it is not limited to this, and any method is possible. As a modification example, an independent car navigation unit may be provided in the HUD apparatus 1, and an AR image may be generated by using its information. In a case where information of buildings and signboards on a map is prepared as information of the DB in the car navigation unit, the information can be utilized. For example, the HUD apparatus 1 refers to map information of the car navigation unit on the basis of positional information of the own vehicle by the GPS, and retrieves information on buildings and signboards in the vicinity of a current position of the own vehicle or a position of the target object. In a case where information on signboards and buildings associated with the signboards is acquired as retrieval result information, the HUD apparatus 1 can construct an AR image by using the information.

(c) In the first embodiment, by using an existing on-vehicle camera 2, video data are inputted to the HUD apparatus 1 as an external input to realize AR display. As a modification example, respective forms in each of which elements of the camera 2 and the camera 3 are included in the AR display apparatus are possible. For example, it may be a form in which the HUD apparatus 1 is provided with the camera 2 and the vehicle exterior photographing unit 102. It may also be a form in which the HUD apparatus 1 is provided with the DB unit 109.

(d) The portion corresponding to the control unit 10 (the image selection unit 11 and the like) of the HUD apparatus 1 may be realized by a portion other than the HUD apparatus 1 such as the ECU 101, and a control unit of the ECU 101 may cooperate with the projection display apparatus, which is the display unit 20 of the HUD apparatus 1, to realize AR display. In other words, the control unit 10 and the display unit 20 may be realized by separate apparatuses.

(e) Elements such as the car navigation unit 106 or the DB unit 109 may be realized by an independent apparatus other than the on-vehicle system 100 or the HUD apparatus 1, for example, a mobile terminal device taken in the vehicle by the user (such as a smartphone, a tablet terminal, or a PC equipped with a Web camera), and a form in which the independent apparatus communicates and cooperates with the HUD apparatus 1 may be adopted.

Second Embodiment

An AR display apparatus according to a second embodiment will be described with reference to FIG. 10 and FIG. 11. A basic configuration of the second embodiment is similar to that of the first embodiment. Hereinafter, a different component part between the second embodiment and the first embodiment will be described. In the second embodiment, a function added regarding an AR function is provided. In the second embodiment, a function to secure visibility regarding an AR image of the object even in a case where an object changes in a field of view of a driver and on a screen 5 so as to move at a comparatively high speed is provided. When a HUD apparatus 1 judges that an object moves in the screen 5 at a comparatively high speed, the HUD apparatus 1 controls a display position of an AR image, for example, a stationary position to heighten visibility of the AR image.

FIG. 10 illustrates a functional block configuration of the HUD apparatus 1 that is the AR display apparatus according to the second embodiment. As a different portion between the configuration illustrated in FIG. 10 and the configuration illustrated in FIG. 1, a control unit 10 includes a moving object judgment unit 16. The moving object judgment unit 16 cooperates with an image selection unit 11 and a visibility judgment unit 12 to execute a process to distinguish a moving object from a fixed object in an image of a camera 2 to be extracted, and a process to calculate a moving speed regarding an object in the image. Further, information indicating a type such as the fixed object or the moving object may be contained in a DB in a DB unit 109 illustrated in FIG. 1 as definition information of the object.

As an object in an actual view, there are a fixed object installed at a fixed position, such as a signboard, and a moving object such as the other vehicle or a person. Other than them, a movable signboard (for example, on-vehicle advertisement) and the like are cited as the moving object. While an own vehicle is traveling, these objects are viewed in the screen 5 and the image so that a position of each of them is moved and changed. In the second embodiment, as well as the first embodiment, the object such as a signboard is set as an AR target. Moreover, in the second embodiment, a moving object such as the other vehicle or a person can also be set as an AR target. An AR image generator unit 13 also generates an AR image regarding the moving object.

In the second embodiment, as a first function, a function to judge whether an object is a fixed object or a moving object and execute AR display for the moving object is provided. In the second embodiment, the image selection unit 11 of the HUD apparatus 1 extracts, as an object, not only a fixed object such as a signboard, but also a moving object such as the other vehicle or a person from an image of the camera 2. The moving object judgment unit 16 judges whether an extracted object area is a fixed object or a moving object. As this way of judgment, a moving speed (will be described later) may be used. As well as the first embodiment, the visibility judgment unit 12 controls the AR display content to be changed in accordance with a judgment result of the moving object and a visibility index value.

Further, in a case where a type of the object is different, in a case where the object is a signboard or a traffic sign, or in a case where the object is a fixed object or a moving object, for example, the HUD apparatus 1 may differentiate display colors and display shapes of these AR images from each other when the AR images are displayed. This allows the driver to easily recognize a difference of the kind of the object.

Moreover, in the second embodiment, as a second function, a function to change a way of the AR display in accordance with the moving speed of the object in the screen 5 and the image is provided. In particular, a function to cause the display position of the AR image to stop in a case where the moving speed of the object is high is provided. The moving object judgment unit 16 of the HUD apparatus 1 calculates a moving speed and a moving direction of an object (a signboard or a vehicle) which moves in the image of the screen 5 and the camera 2, which correspond to the field of view of the driver. This moving speed is a speed when a position of an object area moves in the screen 5 and the image, and is a relative speed with respect to a traveling speed of the own vehicle and a point of view of the driver.

The visibility judgment unit 12 uses the moving speed of the object as the visibility index value. The visibility judgment unit 12 compares the moving speed of the object with a range of a predetermined threshold value, for example. For example, in a case where the moving speed falls within the range of the predetermined threshold value with respect to a signboard that is a fixed object, the visibility judgment unit 12 judges that the signboard is easily recognized visually to set to predetermined classification (as well as the first embodiment). In a case where it is outside the range, the visibility judgment unit 12 judges that it is hardly recognized visually to set to predetermined classification. Namely, it is judged that the driver cannot track the object moving with a comparatively high speed. The visibility judgment unit 12 determines predetermined AR display content (type), in which the display position of the AR image of the moving object is set as the stationary position, in accordance with the latter classification. The AR image generator unit 13 also considers the moving direction to determine the stationary position, which is the display position of the AR image of the object, in accordance with its determination. Further, the AR image generator unit 13 may also keep the display size of the AR image of the moving object at a fixed size. This allows the driver to more easily recognize the AR image of the moving object visually.

The moving speed of the object in the image can be calculated as follows, for example. The moving speed may simply be calculated from a difference of positions of the object area between image frames of video data (a distance between pixels). So long as the classification can be executed, high accuracy is not required for calculation of the moving speed. Alternatively, the moving speed can be calculated on the basis of a relative positional relationship between the own vehicle and the object, for example, by using a speed and an angular velocity when the own vehicle turns right or left. For example, information on a vehicle speed, acceleration, an angular velocity, and angle of the own vehicle can be acquired from a vehicle speed meter, an acceleration sensor, a gyroscope sensor, and the like of the own vehicle. Further, in a form using a HMD apparatus, information on an angular velocity and an angle can be acquired by using a magnetic sensor and a gyroscope sensor mounted on the HMD apparatus.

FIG. 4 illustrates an example of movement of the own vehicle. A signboard 44 that is viewed in the vicinity of an intersection of a road 31 in the screen 5 and the field of view and diagonally forward right from the point of view is a fixed object, and is an AR target. When the own vehicle turns right at the intersection in a direction indicated by an arrow 401, the own vehicle passes in front of the signboard 44. In such a case, the driver views the signboard 44 in the screen 5 so that the signboard 44 moves at a comparatively high speed.

Figure 11:
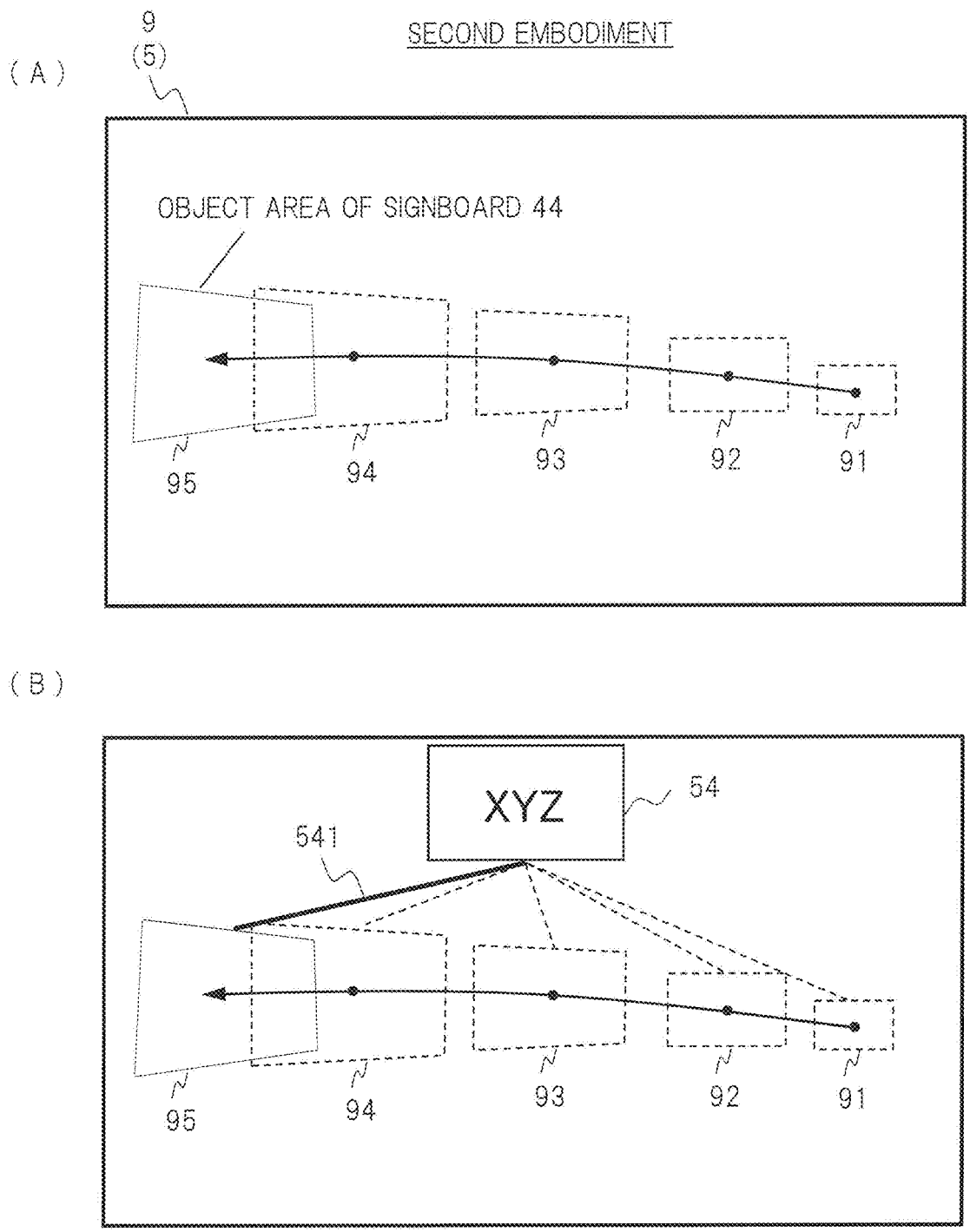
FIG. 11 is a view illustrating an example of a screen according to the second embodiment.

FIG. 11 simply illustrates a state of the screen 5 corresponding to such a case in time series. (A) of FIG. 11 schematically illustrates how an object area corresponding to the signboard 44 is viewed to move in the field of view. For example, the object area of the signboard 44 is viewed at a position of an area 91 at a first point in time (for example, when the own vehicle starts to enter the intersection). Next, at a second point in time, the object area of the signboard 44 moves to an area 92 in accordance with advance of the right turn. Similarly, the object area of the signboard 44 moves to an area 93 at a third point in time, moves to an area 94 at a fourth point in time, and moves to an area 95 at a fifth point in time, whereby the position changes continuously. An arrow indicates a movement locus.

(B) of FIG. 11 illustrates an example in which an AR image 54 of the signboard 44 is displayed in the time corresponding to (A). For example, the moving object judgment unit 16 calculates the moving speed of the signboard 44 from the vehicle speed of the own vehicle and the angular velocity at the time of the right turn, and compares the moving speed with a threshold value. In a case where the moving speed is the threshold value or higher, it is judged that the signboard 44 is hardly recognized visually because the signboard 44 moves at a comparatively high speed. The moving object judgment unit 16 sets predetermined classification and a type. The AR image generator unit 13 generates the AR image 54 of the signboard 44 in accordance with them. As an example of the AR image 54, an image of a front face of the signboard 44 is subjected to an enlarging process, whereby a described character "XYZ" becomes a sufficient size. The AR image generator unit 13 determines a display position of this AR image 54 so as to become a stationary position in the screen 5 against the positions of the areas 91 to 95 that change in time series. In the present embodiment, the stationary position of the AR image 54 is a position located at an upper side than the signboard 44, and is particularly a position in the vicinity of the center in the area of the areas 91 to 95.

The control unit 10 photographs the object in time series, and grasps a point in time (or an image frame) when the object area is detected, and the position of the object area in the image at the point in time (for example, a positional coordinate of a pixel of a central point of the object area) so as to be associated with each other. The control unit 10 may grasp a vehicle position or an object distance at each point in time. The control unit 10 uses the information grasped in time series to calculate and grasp the moving speed and the moving direction of the object in the screen 5 and the image. For example, the image selection unit 11 calculates the moving direction (example: a substantially left direction like the illustrated arrow) and the moving speed of the object area of the signboard 44 from a difference between the area 91 at the first point in time and the area 92 at the second point in time.

The AR image generator unit 13 determines the stationary position of the AR image 54 in accordance with the moving direction and the moving speed. It is understood that the moving direction at the second point in time is a substantially left direction. Therefore, a position on the left side of the area 92 is selected as the stationary position together with such destination prediction.

Herewith, the AR image 54 is displayed at the same position so as to be stationary in time when the signboard 44 moves in the screen 5. For that reason, a clear state is kept without obstructing the field of view (the central area R1) in the time while the vehicle is traveling. The driver easily recognizes the AR image 54 associated with the signboard 44 visually. As a comparison example, in a form in which the AR image is displayed at a position tracking movement of the object (the signboard 44) in the screen 5, it becomes difficult for the driver to recognize the AR image visually in a case where the moving speed is high.

Further, in the present embodiment, as a part of the AR image 54 or a video effect, the AR image generator unit 13 displays a lead line 541 that is a line segment connecting between the moving object area of the signboard 44 and the AR image 54 in time series. For example, in a state of the fifth point in time, the lead line 541 is displayed so as to connect the area 95 to the AR image 54. The display of the lead line allows the driver to more easily recognize a relationship between the object and the AR image.

In a case where the target object disappears from the screen 5, in a case where a distance between the object area and the AR image becomes a predetermined value or longer, or in a case where a predetermined time elapses after the AR image is displayed, the HUD apparatus 1 eliminates display of the AR image.

The method of determining the display position of the AR image is not limited to one described above, and any method is possible. For example, with respect to the area 91 of the signboard 44, the AR image 54 is first displayed at its neighboring position at a first point in time. Then, the area is moved, but the AR image 54 is displayed at the same position as that at the first point in time while remaining stationary. Furthermore, the lead line connecting the area and the AR image 54 is displayed at each point in time. Further, for example, the display position of the AR image described above is not limited to the stationary position. Movement of the AR image in the screen 5 may be determined so as to at least become slower than a speed of movement of the target object.

As described above, according to the AR display apparatus of the second embodiment, it is possible to present the AR image of the object, which moves in the field of view of the driver with a comparatively high speed and is thereby hardly tracked visually, so as to be easily recognized visually.

Third Embodiment

An AR display apparatus according to a third embodiment will be described with reference to FIG. 12 and FIG. 13. In the third embodiment, by using a sight line tracking function, an area that becomes a target to extract an object from an image of a camera 2 is limited in accordance with a state of a line of sight of a driver. Herewith, information on a portion that is highly likely to be unnecessary for the driver is eliminated to reduce the amount of information, whereby it is possible to heighten visibility of an object and an AR image that are highly likely to be necessary for the driver.

Figure 12:
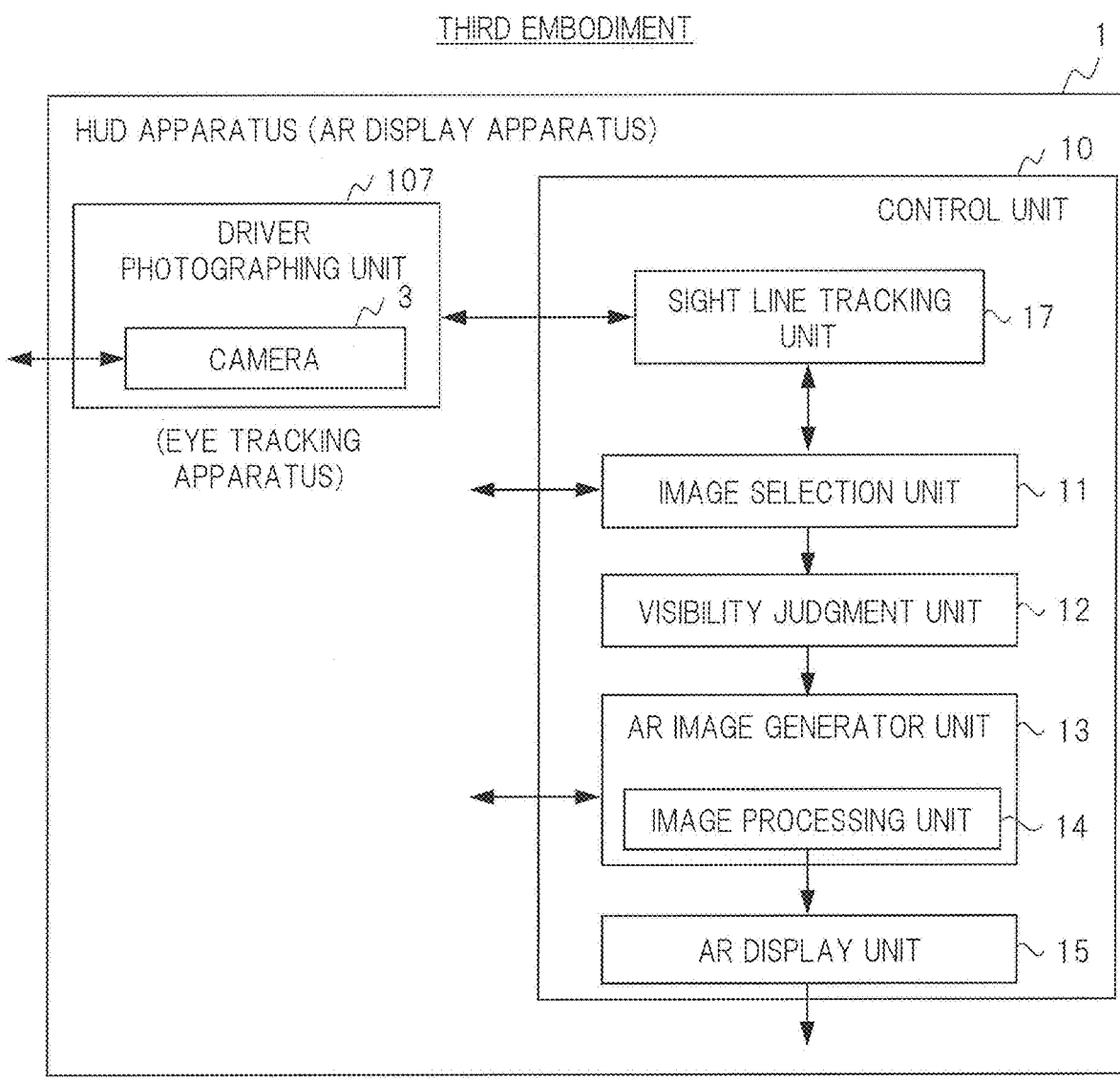
FIG. 12 is a view illustrating a HUD apparatus that is an AR display apparatus according to a third embodiment of the present invention.

FIG. 12 illustrates a functional block configuration of a HUD apparatus 1 that is the AR display apparatus according to the third embodiment. As a different portion between the configuration illustrated in FIG. 12 and the configuration illustrated in FIG. 1, the on-vehicle system 100 and the HUD apparatus 1 include a sight line tracking function to track the line of sight of the driver. The sight line tracking function can be configured by a known technique. In the third embodiment, the sight line tracking function is mainly realized by a driver photographing unit 107. However, it is not limited to this, and any method is possible. The sight line tracking function may be realized by any of the driver photographing unit 107, an ECU 101, and a control unit 10 of the HUD apparatus 1.

The driver photographing unit 107 includes a camera 3, and is a known apparatus with a sight line tracking function (that is, an eye tracking apparatus). The driver photographing unit 107 detects positions of eyes of the driver and the line of sight. The eye tracking apparatus that is the driver photographing unit 107 detects the eyes of the driver by an image of the camera 3 to calculate a direction of the line of sight. As a calculation method, for example, a method of calculating the line of sight from a position of a point of light reflected by a pupil is known. The driver photographing unit 107 outputs information on the grasped line of sight (sight line information).

The control unit 10 of the HUD apparatus 1 includes a sight line tracking unit 17 that cooperates with the driver photographing unit 107. The sight line information is inputted into the sight line tracking unit 17 from the driver photographing unit 107. The sight line tracking unit 17 grasps a state of the line of sight of the driver. The sight line tracking unit 17 grasps, from the state of the line of sight, a point of regard (in other words, an intersection of the line of sight, or a reference point). The point of regard is an intersection with the front of the line of sight in a screen 5. Note that the point of regard may be calculated by the driver photographing unit 107. The sight line tracking unit 17 sets a sight line central area in the screen 5 in real time on the basis of the line of sight and the point of regard. An image selection unit 11 limits the sight line central area of the screen 5 to execute extraction of the object.

Figure 13:
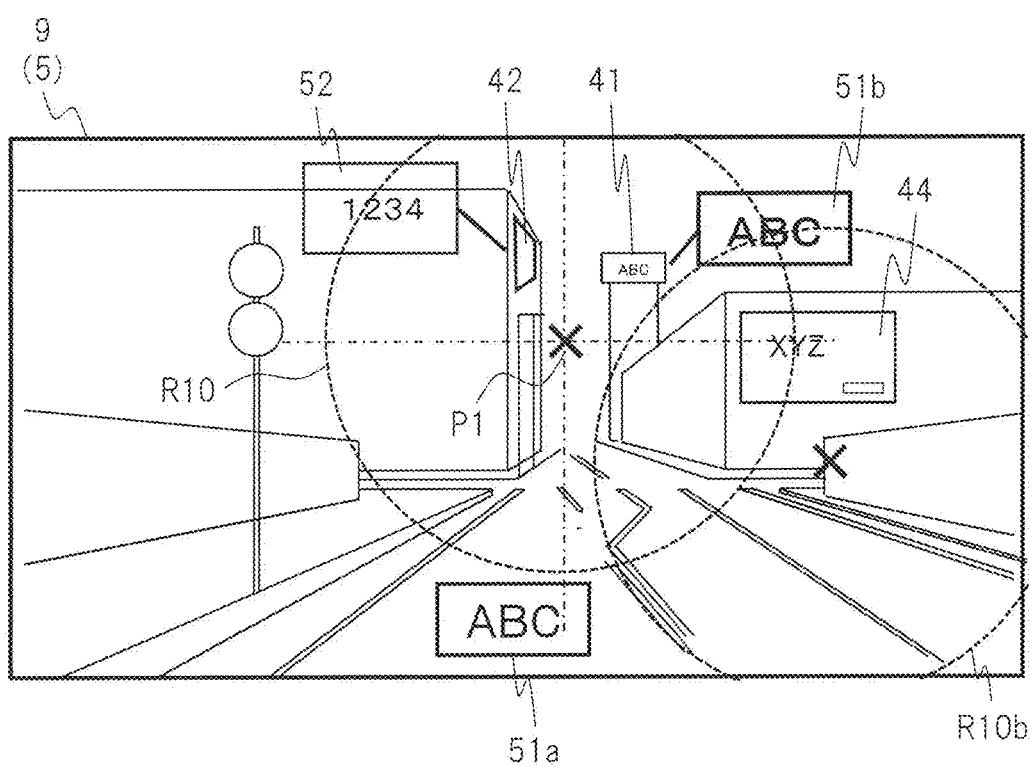
FIG. 13 is a view illustrating an example of a screen according to the third embodiment.

FIG. 13 illustrates an example of a sight line central area R10 and AR image display in the screen 5. A point of regard P1 indicated by a mark "x" indicates one example of the point of regard positioned at the front of the line of sight. The line of sight and the point of regard vary at any time. The sight line tracking unit 17 sets a circular region with a predetermined radius distance as the sight line central area R10 by using the point of regard P1 as a central point, for example. The sight line central area R10 also varies in accordance with variation of the point of regard P1. The sight line central area R10 is an area contained in a predetermined angle of view when the screen 5 is viewed from the point of view of the driver. The angle of view and the radius have a correspondence relation. For example, in a case where the angle of view is about 30°, it is equivalent to an effective visual field range of eyes of a person. In a case where an object is included in the sight line central area R10 corresponding to the effective visual field range, the object can almost be viewed from the driver. Further, in a case where the angle of view is about 5°, for example, it is equivalent to a discrimination visual field of the eyes of the person (an area of regard where a character can be deciphered). In a case where an object is included in the sight line central area R10 corresponding to the discrimination visual field, the driver likely fixes his or her eyes on the object. The sight line central area R10 may be set by a rectangle or the like.

As well as the first embodiment, the image selection unit 11 executes selection and extraction of an object area of the sight line central area R10 as a limited area that is a target to extract the object from the image of the camera 2. In a case where the object area is extracted from the sight line central area R10, it is possible to limit and extract the object on which the driver is likely to intendedly fix his or her eyes, whereby it is possible to acquire image information on the object area.

Specifically, setting of the sight line central area R10 may be as follows. In a case where the sight line tracking unit 17 grasps the line of sight and the point of regard and the point of regard stays at the same position in the screen 5 for a certain time or longer (for example, predetermined seconds) in addition to time judgment, it may be judged that the driver fixes his or her eyes on the vicinity of the position. The sight line tracking unit 17 may set the sight line central area R10 for the first time on the basis of the eye fixing judgment.

Visibility of the object in the area of the sight line central area R10 depends upon the case. For example, if a signboard is small, visibility thereof is low. The visibility judgment unit 12 calculates a visibility index value for the object area in the sight line central area R10, that is, the object area whose central point is included in the sight line central area R10.

In the third embodiment, basically, objects located in the area of the sight line central area R10 are display candidates for the AR image. In particular, in a case where an object located outside the central area R1 and in the area of the sight line central area R10, the object is a display candidate. It is not limited to this. As a modification example, in a case where an object is within the sight line central area R10, the object may be a display candidate regardless of whether the object is inside or outside the central area R1.

The visibility judgment unit 12 classifies and determines whether an AR image the object within the sight line central area R10 is to be displayed or not and processing content in accordance with the visibility index value. This way of determination is possible as well as the first embodiment and the like. The AR image generator unit 13 generates an AR image in accordance with the determination.

In the example of FIG. 13, objects such as the signboard 41 or 42 are included in the area of the sight line central area R10. For that reason, for example, the signboard 41 becomes a display candidate for the AR image. For example, since an object distance is far, it is judged that it is hardly recognized visually with respect to visibility of the signboard 41, thereby classifying it into one in which an AR image is to be displayed. As the AR image of the signboard 41, for example, in the similar manner to the above, the AR image 51a in the fixed position system or the AR image 51b in the neighboring position system is displayed. As content example of this AR image, in the similar manner to the above, an enlarging process or the like is executed. Further, when the AR image is displayed, in the similar manner to the above, a lead line connecting the object area to the AR image may be attached. The lead line is arranged so as to avoid the vicinity of the point of regard P1 as much as possible. Similarly, the signboard 42 has an oblique attitude, and it is judged that it is hardly recognized visually, thereby classifying it into one in which an AR image is to be displayed. As a content example of the AR image 52 of the signboard 42, an attitude changing process or the like is executed.

Note that each of the AR image 51b and the AR image 52 are displayed at a position on the circumference so that a part thereof is included in the sight line central area R10. However, it is not limited to this. They may be displayed at a position where they are outside the sight line central area R10.

An example in which the line of sight and the point of regard move and the sight line central area R10 is set to another position is illustrated as a sight line central area R10b. The signboard 44 is included in this area of the sight line central area R10b, for example. The signboard 44 is judged to have high visibility in the sight line central area R10. Therefore, the signboard 44 is set to the first classification, and an AR image thereof is not displayed. Note that the HUD apparatus 1 may erase the AR image of the object in a case where the object positioned in the sight line central area R10 goes out therefrom by means of movement of the line of sight and the point of regard.

As described above, according to the AR display apparatus according to the third embodiment, it is possible to present an AR image easily recognized visually with respect to an object positioned in the sight line central area of the driver and hardly recognized visually. Since a target area for the processing is limited, it is possible to suppress the amount of information in the screen 5, and it is possible to heighten visibility totally.

Fourth Embodiment

An AR display apparatus and the like according to a fourth embodiment will be described with reference to FIG. 14 and FIG. 15. In the fourth embodiment, an AR image including related information regarding an object is displayed in a state where visibility thereof is high. This makes it possible to provide valuable information to a driver, whereby convenience can also be heightened. In the fourth embodiment, the related information is retrieved and acquired from a DB in a DB unit 109 on the basis of an extracted object. In the fourth embodiment, character information by the related information can also be provided in addition to information on a described character of an object that can be viewed from the driver. In the fourth embodiment, it is judged what is related to an object contained in a photographed image, and the related information is provided. In the fourth embodiment, information obtained by combining information on an actually viewed object with related information acquired from an object in an image is displayed as an AR image.

Figure 14:
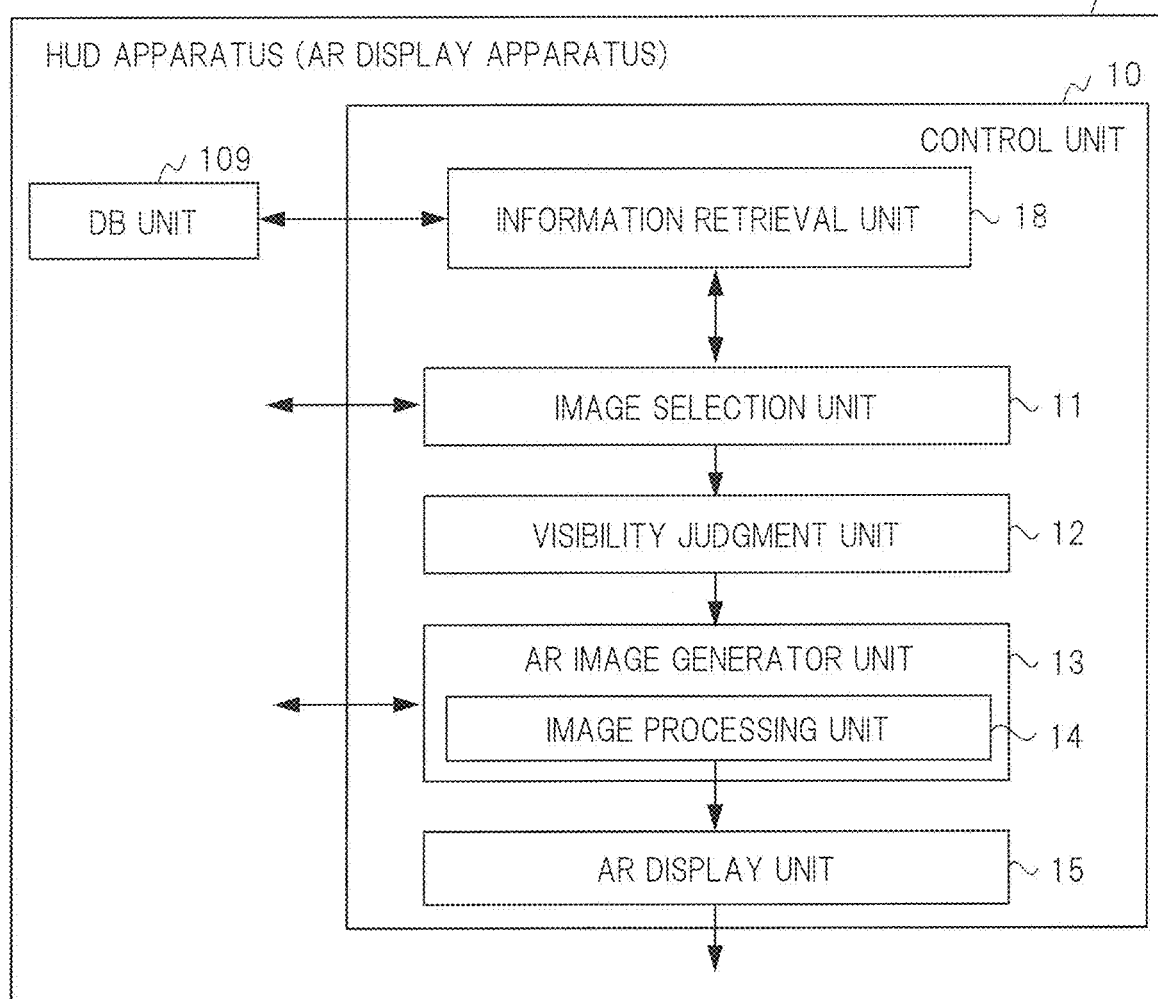
FIG. 14 is a view illustrating a HUD apparatus that is an AR display apparatus according to a fourth embodiment of the present invention.

FIG. 14 illustrates a functional block configuration of a HUD apparatus 1 that is the AR display apparatus according to the fourth embodiment. As a different portion between the configuration illustrated in FIG. 14 and the configuration illustrated in FIG. 1, a control unit 10 has an information retrieval unit 18 that cooperates with an image selection unit 11 or the like. The information retrieval unit 18 retrieves the related information from the DB in the DB unit 109 on the basis of information on an object extracted from an image.

The image selection unit 11 of the HUD apparatus 1 extracts an object area of an object (for example, a signboard) from an image from a camera 2. Further, in a case where characters can be recognized from the object area by OCR processing, the image selection unit 11 also extracts character information thereof. The information retrieval unit 18 uses information on the object area extracted by the image selection unit 11 as search criteria to retrieve related information regarding the object from the DB in the DB unit 109 (or a DB in a car navigation unit 106 or a DB server on an external communication network). The information retrieval unit 18 acquires the related information of the object from a retrieval result. The related information indicates what signboard, what building puts up the signboard, or the like, for example, and is optional information registered in the DB.

The information retrieval unit 18 may use the character information that can be extracted from the object area to retrieve the information from the DB. Further, the information retrieval unit 18 may use an image of the object area extracted from the image to execute image retrieval from the DB. In this case, for example, it is possible to retrieve the related information from appearance of a signboard. Alternatively, the information retrieval unit 18 may use information of the object area to temporarily acquire basic information of the object from the DB, and use the basic information to execute retrieval of the related information from the DB in the DB unit 109.

The information acquired from the external communication network (for example, a data center of a business operator) via the communication unit 104 is stored in the DB in the DB unit 109, for example. Note that as described above, various types of forms to execute retrieval from an external DB are possible. This DB includes an image DB from which image retrieval is possible. An image (an object image) regarding the target object and information (the basic information and the related information) regarding the object are registered in this DB so as to be associated with each other, for example.

The object image may be a reference image with high quality when viewed from a front face regarding the signboard that is the target object, for example. In such a case, by using the reference image as original data, it is possible to generate an AR image with high visibility. The basic information may contain information (information on items of the information category illustrated in FIG. 9) indicating a kind of a convenience store or a restaurant, which puts up the signboard, in addition to the feature information and the definition information described above, for example. The related information is detail description information regarding a shop or the like that puts up the signboard, for example. The related information may have information on characters that are described on the signboard. In such a case, it is possible to present the information regarding the shop that puts up the signboard when the AR image is to be presented.

The visibility judgment unit 12 judges and classifies visibility regarding the object area in the similar manner to the above. The AR image generator unit 13 generates an AR image whose visibility is heightened on the basis of the result in the similar manner to the above. At that time, the AR image generator unit 13 generates the AR image by using the related information of the object. The AR image generator unit 13 combines information directly acquired from the object area with the related information acquired by the retrieval to generate an AR image with high visibility. Note that the AR image generator unit 13 may cause the information retrieval unit 18 to execute retrieval when the AR image is generated.

The information retrieval unit 18 executes image retrieval of the image of the object area as the search criteria from the image DB in the DB unit 109, for example. The object image with high visibility is acquired from a retrieval result. For example, an image photographed with high quality in which the front face of the signboard is a right rectangle is acquired. The AR image generator unit 13 uses the image to generate an AR image. The AR image generator unit 13 causes the image processing unit 14 to subject image processing for an image of the retrieval result, whereby the visibility may be heightened further.

FIG. 15 illustrates an example of a screen 5. In the present embodiment, a signboard 45 is installed in the screen 5 and the image at a position near a road 31 in front of a building 32*a*. The target object is the signboard 45, for example. A front face of the signboard 45 faces a point of view of the driver. However, it is located at the position comparatively far therefrom, and is a state where a described character is hardly recognized visually.

An AR image 55A indicates a first display example regarding an AR image of the signboard 45. The AR image 55A is configured by an AR image 55A1 and an AR image 55A2. The AR image 55A is displayed at a position in a lower side area R3 by a fixed position system. The AR image 55A1 is an AR image based on the information directly acquired from the object area. The AR image 55A1 is the AR image obtained by subjecting the object area to the enlarging process as processing so that the described character of the signboard 45 becomes easily recognized visually. In the present embodiment, the AR image 55A1 is created by using the character information extracted from the object area of the signboard 45 by the OCR processing. The described character of the signboard 45 is "OPEN 10:00 to 21:00 CURRENTLY OPEN", for example, and may contain information on an opening time, a closing time, and a currently opening state.

The AR image 55A2 is an AR image based on the related information of the object. For example, in a case where character information "restaurant XYZ" is acquired, the AR image 55A2 is created as an image with high visibility by using the character information as related information of the signboard 45. This related information indicates that a kind of shop that puts up the signboard 45 is a restaurant and a name of the shop is "XYZ".

An AR image 55B indicates a second display example regarding an AR image of the signboard 45. The AR image 55B is configured by an AR image 55B1 and an AR image 55B2. The AR image 55B is displayed by a neighboring position system so that a lead line is attached to a position (example: a left side) near the signboard 45. The AR image 55B1 is an AR image based on the information directly acquired from the object area. The AR image 55B1 is the AR image obtained by subjecting the object area to the enlarging process as processing so that the described character of the signboard 45 becomes easily recognized visually. As well as the AR image 55A2, the AR image 55B2 is the AR image based on the related information of the object. In the present embodiment, the AR image 55B2 is displayed under the AR image 55B1 as an area of a frame indicated by a broken line. A background of any AR image becomes a transparent area.

As described above, according to the AR display apparatus of the fourth embodiment, it is possible to present more detailed information containing the related information of the object as an AR image to be easily recognized visually, and this makes it possible for the driver to heighten convenience and an added value of AR usage. Further, in the fourth embodiment, by using different and independent image with high visibility for an object whose original visibility is low on the basis of the image retrieval, it is possible to generate and display an AR image with high visibility. For that reason, even in a case where it is difficult to acquire an image with high visibility by the image processing, it is possible to present a suitable AR image.

Note that during the image retrieval, general image retrieving service on the Web may be used. However, by preparing the object image with high visibility in the image DB in the DB unit 109 in advance, high-speed processing and suitable AR image presentation are possible. Moreover, as a modification example, a plurality of images regarding the target object, which are respectively photographed with various conditions, may be registered in the image DB in the DB unit 109 in advance. For example, they are images in which a condition such as camera lens performance, a photographing distance, or weather is different. A low-quality image regarding the target object in a bad visibility situation, a high-quality image in a good visibility situation, and the other object information are registered in the image DB so as to be associated with each other. this makes it possible to realize suitable AR display corresponding to various situations at the time of AR usage. Even in case of the low-quality image when a photographing situation is not good, it is possible to acquire a high-quality image by means of retrieval.

Note that at the time of judgment to extract an object from an image in the image selection unit 11, an image retrieval function of the information retrieval unit 18 may be utilized. Namely, the information retrieval unit 18 executes image retrieval (in other words, image matching with another group of images) from the image DB by using the image of the object area as search criteria. The image selection unit 11 can extract a predetermined object (for example, a signboard) from the image retrieval result.

Modification Example (1)

The following is possible as a modification example of the fourth embodiment. The HUD apparatus 1 uses related information of an object in an image to judge whether or not there is the other objects (for example, a building) in a space, which is associated with an object (for example, a signboard) in an image. In a case where the other objects in the space can be specified, the HUD apparatus 1 may associate these objects (a signboard and a building) with each other to present an AR image. For example, as buildings associated with the signboard 45 illustrated in FIG. 15, the building 32*a* and the building 32*b*, which are located around the signboard 45, are thought as candidates. For example, the information retrieval unit 18 may retrieve buildings located within a predetermined radius distance from a central point obtained from positional information of the signboard 45 in the space from a DB, and set buildings of a retrieval result as candidates.

Moreover, the information retrieval unit 18 may use positional information of the building as the candidate to retrieve information on the building from the DB, and judge whether the building is a building associated with a target signboard or not. For example, it is judged that the signboard 45 is associated with the building 32*a*.

In a case where the building 32*a* associated with the signboard 45 is specified, the HUD apparatus 1 generates an AR image including information on the building 32*a* associated with the signboard 45 as an AR image of the signboard 45, and displays the generated AR image. Alternatively, the HUD apparatus 1 may generate another AR image regarding the building 32*a*, and display the AR image of the signboard 45 and the AR image of the building 32a to be associated with each other by a lead line or the like.

Modification Example (2)

The following is possible as a modification example of the fourth embodiment. In this modification example, a function to maintain and update information of a DB in a DB unit 109 is provided. The DB in the DB unit 109 is provided in a DB server of a data center on an external communication network, for example. A business operator manages the DB. Users of a plurality of vehicles use the same service, and the on-vehicle system 100 access the same DB so as to be shared. In the DB, an image and information of an object are updated so as to become the latest state on the basis of information on the object acquired from an image photographed by the vehicle of each user.

For example, as a signboard, an installed position thereof may change, or the described content thereof may change. Further, as a building, a state of appearance thereof may change due to under construction or the like. In a case where the registered content of map information in a DB in a car navigation unit 106 is not updated, it is impossible to acquire actual and the latest information of the object in real time. Thus, in this modification example, a function to update the information content of a DB in a DB unit 109 to the latest state so as to address a change in appearance of the object as soon as possible is provided. Herewith, each user can acquire the information of the object in the latest state as an AR image when an AR function is utilized, whereby it is possible to heighten convenience. In addition, maintenance work of the DB becomes easy for the business operator.

The information and the image of the object, information on a position and a direction, information on whether the appearance of the object is changed or not and change date and time, and the latest image of the object area when appearance of the object is changed are registered in the DB in the DB unit 109 of the data center so as to be associated with each other. Further, information on a photographing direction of a camera 2 regarding the object image may be registered in the DB. A plurality of object images obtained by photographing the same object from respective directions may be registered.

The HUD apparatus 1 extracts the object area of the latest state from the image of the camera 2. The information retrieval unit 18 uses an image and information of the object area to retrieve the information from the DB in the DB unit 109 via the communication unit 104. The information retrieval unit 18 transmits the information of the object of the latest state to the server of the data center. The server of the data center receives the information, and confirms registration information of the DB. Ina case where it is judged that there is a change in appearance of the object, the registration information of the DB is updated to the latest state.

By using the object information and the object image that can be acquired from the DB, it is possible to display the AR image of the latest state with high visibility at the time of AR presentation. Further, in a case where a plurality of object images whose photographing directions are different from each other is used, it is possible to generate a suitable AR image according to the direction from an own vehicle to the object.

Modification Example (3)

The following is possible as a modification example of the fourth embodiment. In this modification example, a variable position of a moving object in an actual space is registered so as to be reflected to map information of a DB in a DB unit 109, oneself or a plurality of users including oneself can share it. As the moving object, for example, the other vehicle operated by a person such as a family or an acquaintance of a driver can be set as a target. The target vehicle and the target person can be set in advance by an image form. Further, as an application example, it can be used for search of a vehicle or a person. Further, as another application example, it can be used for registration of a situation such as weather or traffic congestion.

The HUD apparatus 1 detects a position in a space regarding an object in an image photographed by a camera 2. For example, it is possible to calculate a position of the object accurately to an extent on the basis of a relationship between positional information of an own vehicle and the position of the object in the image. Further, by using a known position of the object on a map, it is possible to detect the position of the target object with high accuracy.

For example, the HUD apparatus 1 accesses the map information of the DB in the DB unit 109 of an external data center. Then, the HUD apparatus 1 registers information containing a position of the own vehicle, the detected position of the object, an image of appearance, and sensor information in the map information of the DB. A server of the data center executes registration and update of the information of the DB, and aggregate calculation of situations. An on-vehicle system 100 of each user can access and utilize the updated map information of the DB. Each user acquires the latest information such as the vehicle of the other person as an AR image.

As described above, the present invention has been explained concretely on the basis of the embodiments. However, the present invention is not limited to the embodiments described above, and can be modified into various forms of applications without departing from the substance of the invention. The components of each of the embodiments can be added or deleted, separated or merged, replaced, or combined. The numeral values and the like of the concrete example in each of the embodiments are one example. A part or all of the functions of each of the embodiments may be realized by hardware such as an integrated circuit, or may be realized by software program processing. Each kind of the software may be stored in the corresponding apparatus in advance at the time of shipment of a product, or may be obtained from an external apparatus via communication after shipment of the product. The present invention is not limited to the on-vehicle system, and can be applied to various kinds of intended usage.

REFERENCE SINGS LIST

1 . . . HUD apparatus (AR display apparatus), 2 . . . camera, 3 . . . camera, 5 . . . screen, 9 . . . front shield, 10 . . . control unit, 11 . . . image selection unit, 12 . . . visibility judgment unit, 13 . . . AR image generator unit, 14 . . . image processing unit, 15 . . . AR display unit, 20 . . . display unit, 21 . . . display driving circuit, 22 . . . display element, 23 . . . light source, 24 . . . optical system, 100 . . . on-vehicle system, 101 . . . ECU, 102 . . . vehicle exterior photographing unit, 103 . . . video data storage unit, 104 . . . communication unit, 105 . . . GPS receiver, 106 . . . car navigation unit, 107 . . . driver photographing unit, 108 . . . sensor unit, 109 . . . DB unit.

The invention claimed is:

1. An Augmented Reality (AR) display apparatus to display an AR image, being image information on augmented reality, onto a screen transmitting an actual view of an external world, the AR display apparatus comprising:
a processor, which when executing a program, configures the processor to:
determine whether an object in an image photographed by a camera is a fixed object or a moving object, the fixed object being an object that does not move, the camera being configured to photograph an area including an actual view corresponding to a field of view of a user, the moving object being an object that is moving;
extract, in a case where the processor determines that the object is the fixed object, a pixel in an area of the fixed object with respect to a plurality of image frames;
obtain an amount of change in a position of the pixel extracted with respect to the plurality of image frames;
judge visibility of the user to the fixed object in the actual view of the external world viewed through the screen on a basis of the amount of change in the position of the pixel;
control the AR image regarding the fixed object;
calculate a moving direction of the fixed object on a basis of a difference between the area of the fixed object at a first point in time and the area of the fixed object a second point in time, the area of the fixed object changing in time series on the screen transmitting the actual view of the external world;
predict the area of the fixed object at a third point in time on a basis of the area of the fixed object at the second point in time and the calculated moving direction; and
display the AR image of the fixed object at a position different from the predicted area of the fixed object at the third point in time,
wherein the different position where the AR image is displayed is a position that does not overlap with a predicted movement trajectory of the area of the fixed object based on the moving direction,
wherein the different position where the AR image is displayed is temporally ahead in the moving direction,
wherein different positions that are positions where the AR image is displayed are selected as neighboring positions when following the area of the fixed object at the third point in time,
wherein the AR image is displayed with a selected position as a static position for a period of time including at least the third point in time, and
wherein the different position where the AR image is displayed is a position above the area of the fixed object at the third point in time when the predicted movement trajectory is a horizontal movement trajectory.

2. The AR display apparatus according to claim 1, wherein the object is classified into at least two classifications including first classification and second classification on the basis of the visibility,
wherein with respect to the object of the first classification, the processor is further configured to control the object so that the AR image is not displayed, or so that the AR image is generated and displayed without performing the image processing for the object, and
wherein with respect to the object of the second classification, the processor is further configured to control the object so that the object is subjected to the image processing to generate and display the AR image.

3. The AR display apparatus according to claim 1, wherein the object is classified into at least three classifications including first classification, second classification, and third classification on the basis of the visibility,
wherein with respect to the object of the first classification, the processor is further configured to control the object so that the AR image is generated and displayed without performing the image processing for the object,
wherein with respect to the object of the second classification, the processor is further configured to control the object so that the object is subjected to first processing to generate and display the AR image, and
wherein with respect to the object of the third classification, the processor is further configured to control the object so that the object is subjected to second processing to generate and display the AR image.

4. The AR display apparatus according to claim 1, wherein a central area is set in the screen, and
wherein the AR image is displayed at a position outside the central area in the screen.

5. The AR display apparatus according to claim 1, wherein the image processing is an enlarging process to enlarge an image of the area of the object.

6. The AR display apparatus according to claim 1, wherein the image processing contains optical character recognition (OCR) processing to generate a character image by using character information extracted from an image of the object.

7. The AR display apparatus according to claim 1, wherein the image processing contains an attitude changing process to convert attitude of an image of the area of the object so as to become a state of a front face when viewed from a point of view of the user.

8. The AR display apparatus according to claim 1, wherein the processor is further configured to:
track a line of sight of the user, and set a sight line central area on a basis of a point of regard, the point of regard being an intersection between a front of the line of sight and the screen; and
extract the object from the sight line central area.

9. The AR display apparatus according to claim 1, wherein the processor is further configured to:
execute retrieval in a database, basic information and related information regarding the object being registered in the database,
wherein the processor is further configured to execute retrieval by being configured to: retrieve the basic information or related information from the database on the basis of information on the object extracted from the image; and generate the AR image by using retrieval result information that is a retrieval result, the AR image including the basic information or the related information regarding the object.

10. The AR display apparatus according to claim 9, wherein an object image of the object is also registered in the database, and
wherein the processor is further configured to execute retrieval by being configured to: retrieve the database as an image on the basis of an image of the object extracted from the image; and use the object image as a retrieval result to generate the AR image.

11. The AR display apparatus according to claim 1, wherein the AR display apparatus is a head up display apparatus mounted in an on-vehicle system, and
wherein the AR display apparatus further comprises:
a display controller configured to execute projection display onto the screen, the screen being configured by a front shield of a vehicle.

12. The AR display apparatus according to claim 1, wherein the fixed object includes a signboard.

13. The AR display apparatus according to claim 1,
wherein the AR image is controlled to be displayed in a format of attaching a line that connects the object to the AR image.

14. The AR display apparatus according to claim 1,
wherein the static position is located in a vicinity of a center of an upper side area in the screen.

15. The AR display apparatus according to claim 1,
wherein a display position of the AR image regarding the fixed object is controlled so as to be set to a neighboring position of a moving range in which the area of the fixed object changes in the time series.

16. The AR display apparatus according to claim 1,
wherein movement of the AR image in the screen is controlled so as to become slower than a speed of movement of the object.

17. The AR display apparatus according to claim 1,
wherein, in a case where a predetermined time elapses since the AR image is displayed, the AR image is controlled so as to be erased.

18. An Augmented Reality (AR) display method for an AR display apparatus to display an AR image, being image information on augmented reality, onto a screen transmitting an actual view of an external world, the AR display method comprising the steps of:
  determining whether an object in an image photographed by a camera is a fixed object or a moving object, the fixed object being an object that does not move, the camera being configured to photograph an area including an actual view corresponding to a field of view of a user, the moving object being an object that is moving;
  extracting, in a case where it is determined that the object is the fixed object, a pixel in an area of the fixed object with respect to a plurality of image frames;
  obtaining an amount of change in a position of the pixel extracted with respect to the plurality of image frames;
  judging visibility of the user to the fixed object in the actual view of the external world viewed through the screen on a basis of the amount of change in the position of the pixel;
  controlling the AR image regarding the fixed object;
  calculating a moving direction of the fixed object on a basis of a difference between the area of the fixed object at a first point in time and the area of the fixed object a second point in time, the area of the fixed object changing in time series on the screen transmitting the actual view of the external world;
  predicting the area of the fixed object at a third point in time on a basis of the area of the fixed object at the second point in time and the calculated moving direction; and
  displaying the AR image of the fixed object at a position different from the predicted area of the fixed object at the third point in time,
wherein the different position where the AR image is displayed is a position that does not overlap with a predicted movement trajectory of the area of the fixed object based on the moving direction,
wherein the different position where the AR image is displayed is temporally ahead in the moving direction,
wherein different positions that are positions where the AR image is displayed are selected as neighboring positions when following the area of the fixed object at the third point in time,
wherein the AR image is displayed with a selected position as a static position for a period of time including at least the third point in time, and
wherein the different position where the AR image is displayed is a position above the area of the fixed object at the third point in time when the predicted movement trajectory is a horizontal movement trajectory.

* * * * *